(12) United States Patent
Pavlovic

(10) Patent No.: US 12,196,025 B2
(45) Date of Patent: Jan. 14, 2025

(54) ADJUSTABLE LIFTER PLATE ASSEMBLY AND WINDOW REGULATOR RAILS FOR DOOR GLASS AND ASSOCIATED METHODS

(71) Applicant: MAGNA CLOSURES INC., Newmarket (CA)

(72) Inventor: Milos Pavlovic, Kleinburg (CA)

(73) Assignee: MAGNA CLOSURES INC., Newmarket (CA)

( * ) Notice: Subject to any disclaimer, the term of this patent is extended or adjusted under 35 U.S.C. 154(b) by 21 days.

(21) Appl. No.: 18/107,393

(22) Filed: Feb. 8, 2023

(65) Prior Publication Data
US 2023/0295973 A1    Sep. 21, 2023

Related U.S. Application Data

(60) Provisional application No. 63/308,489, filed on Feb. 9, 2022, provisional application No. 63/313,168, filed on Feb. 23, 2022.

(51) Int. Cl.
| | | |
|---|---|---|
| *E05F 11/38* | (2006.01) | |
| *B60J 5/04* | (2006.01) | |
| *E05F 15/689* | (2015.01) | |

(52) U.S. Cl.
CPC ........... *E05F 11/385* (2013.01); *B60J 5/0416* (2013.01); *E05F 15/6892* (2024.01)

(58) Field of Classification Search
CPC . E05F 2011/387; E05F 11/385; E05F 11/382; E05F 11/488; E05F 11/483; E05Y 2900/55; B60J 1/17; B60J 1/004; B60J 5/0419; B60J 5/0416
See application file for complete search history.

(56) References Cited

U.S. PATENT DOCUMENTS

| | | | |
|---|---|---|---|
| 5,960,588 A | 10/1999 | Wurm et al. | |
| 6,598,345 B1 * | 7/2003 | Arimoto | E05F 11/488 49/374 |
| 7,467,494 B2 | 12/2008 | Buchta | |
| 7,607,716 B2 | 10/2009 | Buchta et al. | |
| 8,069,610 B2 | 12/2011 | Graf et al. | |

(Continued)

FOREIGN PATENT DOCUMENTS

| | | |
|---|---|---|
| DE | 10204610 A1 | 8/2003 |
| DE | 10044845 B4 | 6/2004 |

(Continued)

*Primary Examiner* — Justin B Rephann
(74) *Attorney, Agent, or Firm* — Dickinson Wright PLLC

(57) ABSTRACT

A lifter plate assembly for holding a window of a motor vehicle door assembly and facilitating adjustable movement of the window along a vertical direction, and method of construction thereof are provided. The lifter plate assembly includes a main body having a rail guide hook for sliding receipt of a window regulator rail. A window holder is fixed to the main body for fixed receipt of an edge of the window. A cable holder is coupled to the main body via an adjustment mechanism for fixed attachment to at least one cable. The adjustment mechanism is adjustable via a plurality of tool-receiving features to move the main body and the window holder relative to the cable holder along the vertical direction. Each tool-receiving feature is accessible along separate first, second and third axes from one another.

20 Claims, 19 Drawing Sheets

(56) References Cited

U.S. PATENT DOCUMENTS

| | | | | |
|---|---|---|---|---|
| 8,096,080 B2* | 1/2012 | Pavlovic | ............... | E05F 11/488 |
| | | | | 49/374 |
| 10,273,733 B2* | 4/2019 | Huang | ................... | B60J 1/17 |
| 11,162,291 B2* | 11/2021 | Reames | ............... | E05F 11/488 |
| 11,168,501 B2* | 11/2021 | Pavlovic | ............... | E05F 11/382 |
| 11,319,742 B2 | 5/2022 | Bose et al. | | |
| 11,499,361 B2 | 11/2022 | Magazzini | | |
| 2007/0214726 A1 | 9/2007 | Graf et al. | | |
| 2009/0007494 A1* | 1/2009 | Pavlovic | ............... | E05F 11/488 |
| | | | | 49/348 |
| 2010/0325962 A1 | 12/2010 | Hampel et al. | | |
| 2011/0109125 A1 | 5/2011 | Kreher et al. | | |
| 2019/0078366 A1* | 3/2019 | Lu | ................... | E05F 11/483 |
| 2020/0173212 A1* | 6/2020 | Pavlovic | ............... | E05F 11/385 |
| 2022/0410669 A1* | 12/2022 | Ramesh | ................ | B60J 1/004 |

FOREIGN PATENT DOCUMENTS

| | | | | |
|---|---|---|---|---|
| DE | 202005002333 U1 * | 7/2006 | ............ | E05F 11/382 |
| DE | 102009052569 A1 | 5/2011 | | |
| DE | 202015106133 U1 * | 4/2017 | | |
| DE | 202023100988 U1 * | 4/2023 | ................ | B60J 1/17 |
| EP | 1400649 A2 * | 3/2004 | ............ | E05F 11/385 |
| EP | 1400650 A2 | 3/2004 | | |
| EP | 1724427 A2 | 11/2006 | | |
| EP | 1400650 B1 | 5/2011 | | |
| EP | 3530854 B1 | 10/2020 | | |
| GB | 2442735 A | 4/2008 | | |
| GB | 2468405 A | 9/2010 | | |

* cited by examiner

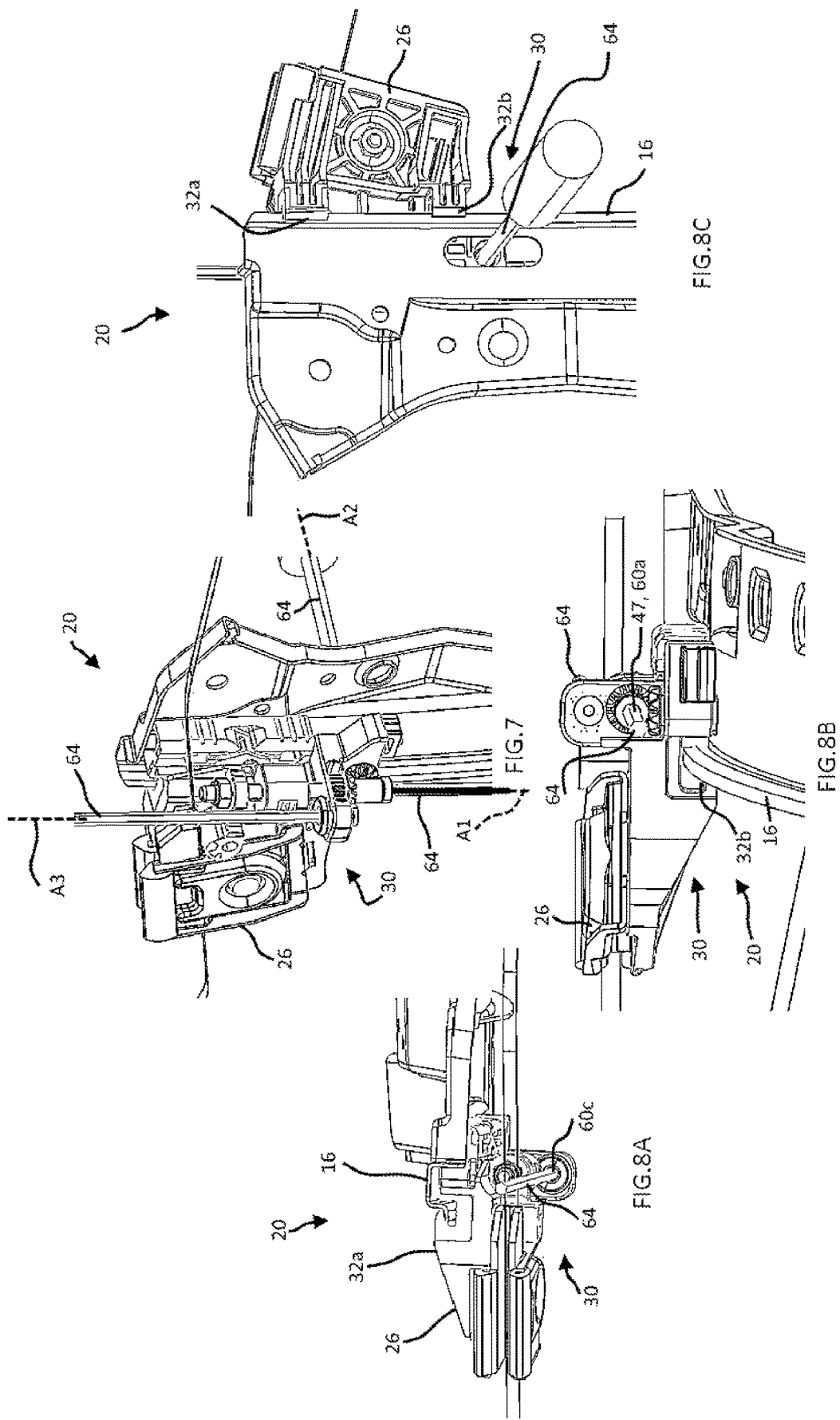

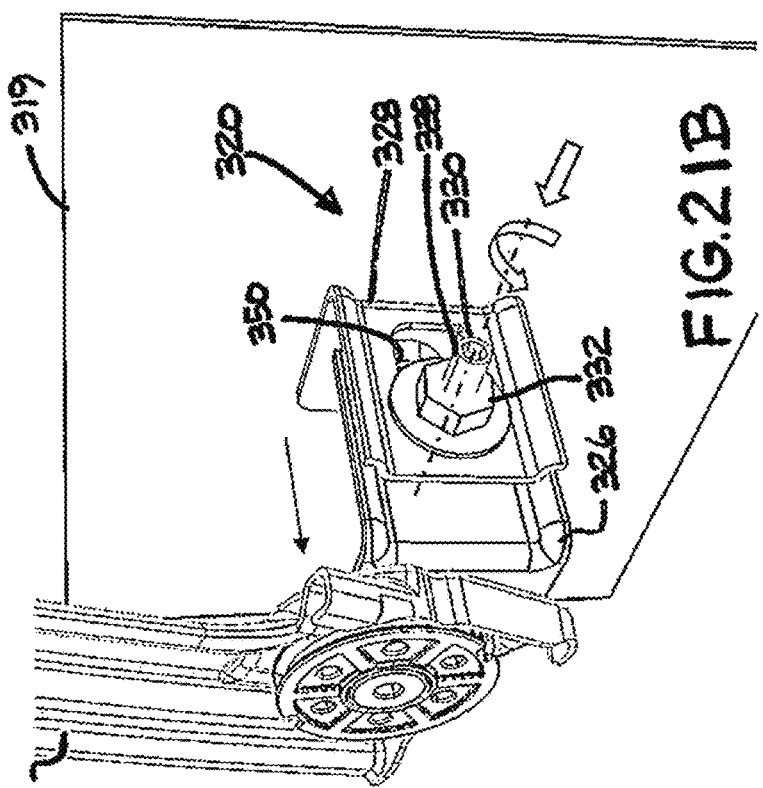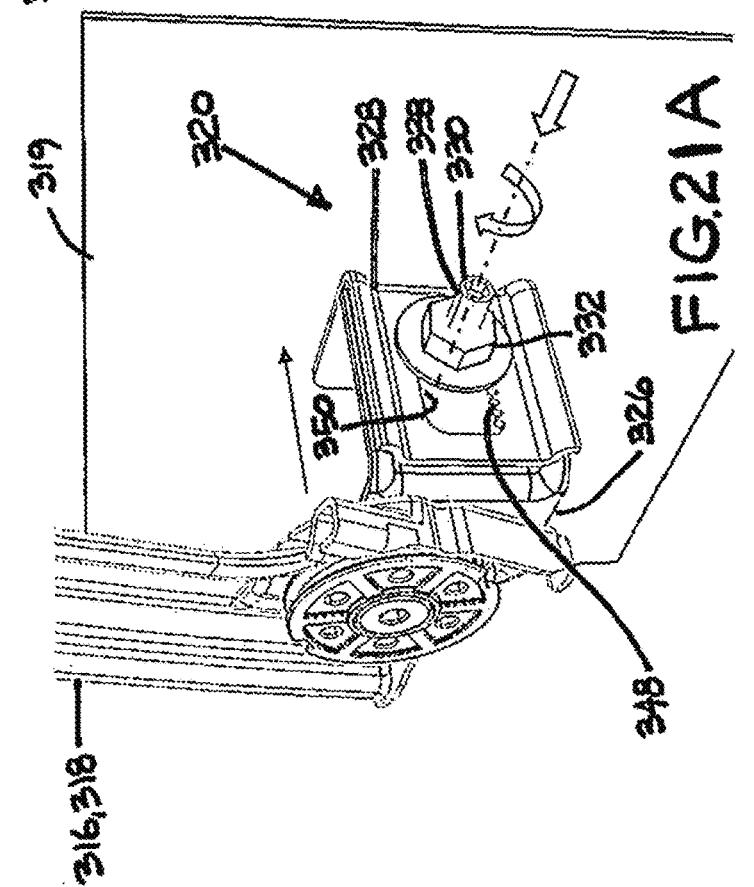

ADJUSTABLE LIFTER PLATE ASSEMBLY AND WINDOW REGULATOR RAILS FOR DOOR GLASS AND ASSOCIATED METHODS

CROSS-REFERENCE TO RELATED APPLICATION

This application claims the benefit of U.S. Provisional Application Ser. No. 63/308,489, filed Feb. 9, 2022 and the benefit of U.S. Provisional Application Ser. No. 63/313,168, filed Feb. 23, 2022, which is incorporated herein by reference in its entirety.

FIELD

The present disclosure relates generally to vehicle window assemblies, and more particularly to vehicle window assemblies and adjustable window regulator lifter plates and window regulator rails therefor.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier module, or simply carrier, is often mounted to the inner door panel within the internal door cavity. The carrier typically functions to support various door hardware components, including window regulator rails configured to support window regulator lifter plates, often simply referred to as lifter plates, for selectively slidable movement therealong, as well as a window regulator motor, often simply referred to as window regulator, to drive the lifter plates along the window regulator rails. The lifter plates are fixed to a door window to cause the door window to slide up and down therewith along the direction of guide channels within the window regulator rails in response to powered actuation of the window regulator.

In certain types of vehicle, such as convertibles, there is commonly variation from vehicle to vehicle in the precise position of the roof, and thus, the precise raised position of a top edge of the door window needs to be adjustable during assembly, as well as in service, in order to achieve a reliable seal with the roof. Additionally, in vehicles such as convertibles, the vehicle door is typically frameless, which means that the vehicle door does not possess an upper portion with a guide track for the window. This adds to the problem because without a guide track, there will be some natural variation in the position of the top edge of the door window due simply to manufacturing tolerances in the door assembly and in any other relevant vehicle components.

To accommodate the aforementioned variation between the position of the roof and top edge of the door window, vehicles are known to have window regulator lifter plate assemblies that are adjustable upwardly and downwardly along a z-axis so as to permit the position of the door window to be adjusted on each individual vehicle by an assembly line worker, as necessary, to provide the appropriate seal between the top edge of the window and the roof.

Although the aforementioned ability to adjust the position of the top edge of the window relative to the roof can prove effective in establishing a reliable seal, drawbacks to known adjustment mechanisms exist. Known window regulator lifter plate assemblies allow adjustment of the window along the z-axis by inserting an adjustment tool into engagement with an adjustment feature of the window regulator lifter plate assembly and rotating the tool in the desired clockwise or counterclockwise direction as needed to raise or lower the top edge of the door window. However, known window regulator lifter plate assemblies only allow for adjustment of the door window along the z-axis via insertion of the adjustment tool along a single axis, such as along an a cross-vehicle y-axis or along the z-axis, and thus, depending on when the adjustment needs to be made in assembly, or in service, adjustment of the door window can be complicated by not having free access to the adjustment mechanism.

In view of the above, there is a need to provide window regulator rails that are adjustable, and further, lifter plate assemblies that are adjustable along the z-axis so as to be able to position the top edge of the window into reliably sealed relation with the roof via insertion of an adjustment tool along a selected one of multiple axes to affect such z-axis adjustment, thereby providing options for accessing an adjustment mechanism with the adjustment tool.

SUMMARY

This section provides a general summary of the disclosure and is not intended to be a comprehensive listing of all features, advantages, aspects and objectives associated with the inventive concepts described and illustrated in the detailed description provided herein.

It is an object of the present disclosure to provide a door module that embodies the inventive concepts set forth in the following written disclosure and illustrations.

It is a further object of the present disclosure to provide lifter plate assemblies that address at least some of those issues discussed above with known lifter plate assemblies.

In accordance with the above object, it is a further object of the present disclosure to provide lifter plate assemblies that are adjustable along a z-axis to position the top edge of the window into reliably sealed relation with the roof by being able to insert an adjustment tool along a selected one of multiple axes to enable the adjustment of the door window along the z-axis.

In accordance with the above objects, it is a further object to provide lifter plate assemblies that are adjustable along a z-axis to position the top edge of the window into reliably sealed relation with the roof by being able to insert an adjustment tool along a selected one of at least two axes selected from a z-axis, corresponding to a vertical axis, a y-axis, corresponding to a cross-vehicle direction axis, and a x-axis, corresponding to a fore/aft direction axis to enable the adjustment of the door window along the z-axis.

In accordance with these and other objects, it is an aspect of the disclosure to provide a lifter plate assembly for holding a window of a motor vehicle door assembly and facilitating adjustable movement of the window along a vertical direction. The lifter plate assembly includes a main body having at least one rail guide hook configured for sliding receipt of a window regulator rail therein. A window holder is fixed to the main body. The window holder provides a receptacle being configured for receipt of an edge of the window therein. A cable holder is configured for fixed attachment to at least one cable, and an adjustment mechanism is configured to provide adjustable movement of the main body and the window holder relative to the cable holder along the vertical direction. The adjustment mechanism is adjustable via a plurality of tool-receiving features.

Each of the plurality of tool-receiving features is accessible along a separate first, second and third axes from one another.

In accordance with another aspect of the disclosure, at least two of the separate first, second and third axes are inclined to one another, thereby being accessible from different vantage points to provide multiple options for adjusting the position of the top edge of the window when moved to its fully closed position.

In accordance with another aspect of the disclosure, at least two of the separate first, second and third axes are generally parallel to one another.

In accordance with another aspect of the disclosure, at least two of the separate first, second and third axes are generally transverse to one another.

In accordance with another aspect of the disclosure, two of the separate first, second and third axes are inclined to one another, and two of the separate first, second and third axes are generally parallel to one another.

In accordance with another aspect of the disclosure, two of the separate first, second and third axes are generally transverse to one another.

In accordance with another aspect of the disclosure, the adjustment mechanism includes a rod extending along the first axis and a nut configured in threaded engagement with the rod. One of the adjustment features is provided at an end of the rod.

In accordance with another aspect of the disclosure, a first gear is fixed to the rod to extend about the first axis and a second gear is configured in meshed engagement with the first gear, with the second gear extending about the second axis. One of the tool receiving features is provided to rotate the second gear about the second axis in a selected clockwise or counterclockwise direction, thereby causing the first gear and the rod to rotate about the first axis to adjustably move the top edge of the window in an upward or downward vertical direction, depending on the direction of rotation of the second gear.

In accordance with another aspect of the disclosure, one of the tool-receiving features is accessible through a bottom shut face of the motor vehicle door assembly.

In accordance with another aspect of the disclosure, the first gear and the second gear are beveled gears, thereby being able to remain meshed with one another, though being rotatable about separate inclined axes.

In accordance with another aspect of the disclosure, one of the tool-receiving features is accessible through an inner panel of the motor vehicle door assembly.

In accordance with another aspect of the disclosure, a third gear is fixed to the rod, with the third gear extending about the first axis. A fourth gear is configured in meshed engagement with the third gear, with the fourth gear extending about the third axis. One of the tool-receiving features is configured to rotate the fourth gear about the third axis, thereby causing the third gear, meshed with the fourth gear, and the rod to rotate about the first axis.

In accordance with another aspect of the disclosure, the third gear and the fourth gear can be provided as spur gears, given they rotate about separate parallel axes.

In accordance with another aspect of the disclosure, one of the tool-receiving features is accessible from a belt line of the motor vehicle door assembly.

In accordance with another aspect of the disclosure, one of the tool-receiving features is accessible from a bottom shut face of the door assembly, one of the tool-receiving features is accessible through an inner panel of the motor vehicle door assembly, and one of the tool-receiving features is accessible from a belt line of the motor vehicle door assembly.

In accordance with another aspect of the disclosure, a motor vehicle door assembly is provided. The motor vehicle door assembly includes a door panel structure having an inner panel, an outer panel, and a bottom shut face, with a cavity bounded by the inner panel, the outer panel, and the bottom shut face. A first window regulator rail and a second window regulator rail are disposed in the cavity. A window is carried by a lifter plate assembly, with the lifter plate assembly including a main body having at least one rail guide hook configured for sliding receipt of one of the first and second window regulator rails therein to facilitate movement of the window along a vertical direction between open and closed positions. The lifter plate assembly further includes a window holder fixed to the main body, wherein the window holder has a receptacle configured for receipt of a bottom edge of the window therein. The lifter plate assembly further includes a cable holder configured for fixed attachment to at least one cable. The lifter plate assembly further includes an adjustment mechanism configured to provide adjustable movement of the main body and the window holder relative to the cable holder along the vertical direction. The adjustment mechanism is adjustable via a plurality of tool receiving features. Each of the plurality of tool-receiving features is accessible along separate first, second and third axes, thereby increasing the number of options available to adjust the position of a top edge of the window, when in a closed position, during assembly.

In accordance with another aspect of the disclosure, a method of constructing a lifter plate assembly for holding a window of a motor vehicle door assembly and facilitating adjustable movement of the window along a vertical direction to bring a top edge of the window into sealed engagement with roof of the motor vehicle is provided. The method includes: providing a main body having at least one rail guide hook configured for sliding receipt of a window regulator rail therein; further, fixing a window holder having a receptacle configured for receipt of a bottom edge of the window to the main body; additionally, coupling a cable holder, configured for fixed attachment to at least one cable to the main body, with an adjustment mechanism to provide adjustable movement of the main body and the window holder relative to the cable holder along the vertical direction; and, configuring the adjustment mechanism for adjustment via a plurality of tool-receiving features, and arranging each of the plurality of tool-receiving features for access along a separate first, second and third axes.

In accordance with another aspect of the disclosure, the method can further include providing the adjustment mechanism having a rod extending along the first axis and a nut in threaded engagement with the rod, and arranging one of the tool-receiving features at an end of the rod to be accessible through a bottom shut face of the motor vehicle door assembly.

In accordance with another aspect of the disclosure, the method can further include fixing a first gear to the rod and configuring a second gear in meshed engagement with the first gear, and arranging one of the tool-receiving features to be accessible through an inner panel of the motor vehicle door assembly to rotate the second gear about the second axis to rotate the first gear and the rod about the first axis.

In accordance with another aspect of the disclosure, the method can further include providing the first gear and the second gear being beveled gears.

In accordance with another aspect of the disclosure, the method can further include fixing a third gear to the rod and configuring a fourth gear in meshed engagement with the third gear, and arranging one of the tool-receiving features being accessible from a belt line of the motor vehicle door assembly to rotate the fourth gear about the third axis to rotate the third gear and the rod about the first axis.

In accordance with another aspect of the disclosure, the method can further include providing the third gear and the fourth gear being spur gears.

It is a further aspect of the present disclosure to provide a door module having adjustable window regulator rails to allow adjustment of a position of a window supported thereby.

It is a further aspect of the present disclosure to provide a frameless glass door module having adjustable window regulator rails to allow adjustment of a position of a window supported thereby.

It is a further aspect of the present disclosure to provide a method of adjustment of a position of a window of a frameless glass door module within the cavity of a vehicle door that embodies the inventive concepts set forth in the following illustrations.

It is a further aspect of the present disclosure to provide a method of adjustment of a position of a window of a frameless glass door module via adjustment of window regulator rails.

In accordance with one aspect, a window regulator rail adjustment mechanism has pinion shaft configured in meshed engagement with a rack, wherein rotation of the pinion shaft in a first direction causes a window regulator rail to move in a cross-vehicle direction outwardly from a carrier, and wherein rotation of the pinion shaft in a second direction causes a window regulator rail to move in a cross-vehicle direction inwardly toward the carrier.

In accordance with another aspect, the pinion shaft is oriented to extend along a Z-axis, such that the pinion shaft is readily accessible and adjustable through a bottom panel of a door module.

In accordance with another aspect, the pinion shaft is oriented to extend along a X-axis, such that the pinion shaft is readily accessible and adjustable through a shut face of a door module.

In accordance with one aspect, a method of adjusting a window regulator rail to move in a cross-vehicle direction outwardly from a carrier and inwardly toward the carrier includes inserting a tool through one of a side shut face or bottom shut face of a vehicle door and rotating a pinion gear with the tool to cause the movement of the window regulator rail in one of the outward or inward cross-vehicle directions.

In accordance with a further aspect, the method can include causing a pinion gear fixed to the pinion shaft to travel along a tooth rack, thereby causing the pinion shaft to drive a flange fixed to the window regulator rail in the cross-vehicle direction.

In accordance with a further aspect, a method of providing for a window regulator rail to be adjusted in a cross-vehicle direction (along Y-axis) outwardly from a carrier and inwardly toward the carrier from one of a bottom shut face or side shut face of a vehicle door is provided. The method includes a step of arranging a pinion shaft to extend through a flange, fixed to the window regulator rail, and along a Z-axis for access to the pinion shaft via a tool from the bottom shut face or along an X-axis for access to the pinion shaft via the tool from the side shut face. The method further includes a step of arranging a gear fixed to the pinion shaft in meshed engagement with a toothed rack fixed to the carrier so that the gear travels along the toothed rack in response to rotation of the pinion shaft, thereby causing the pinion shaft move along the desired cross-vehicle direction and to drive the flange and the window regulator rail fixed thereto in the desired cross-vehicle direction.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 7 illustrates the multiple adjustment features of the lifter plate assembly with a tool shown engaging each adjustment feature from a different orientation;

FIG. 8A illustrates a tool engaging an adjustment feature from a belt line of the motor vehicle door assembly of FIG. 1;

FIG. 8B illustrates a tool engaging an adjustment feature from a bottom shut face of the motor vehicle door assembly of FIG. 1;

FIG. 8C illustrates a tool engaging an adjustment feature from an inboard face of the motor vehicle door assembly of FIG. 1;

FIG. 21A illustrates the window regulator rail adjusted inwardly relative to the carrier;

FIG. 21B illustrates the window regulator rail adjusted outwardly relative to the carrier;

DETAILED DESCRIPTION OF PRESENTLY PREFERRED EMBODIMENTS

Figure 1:
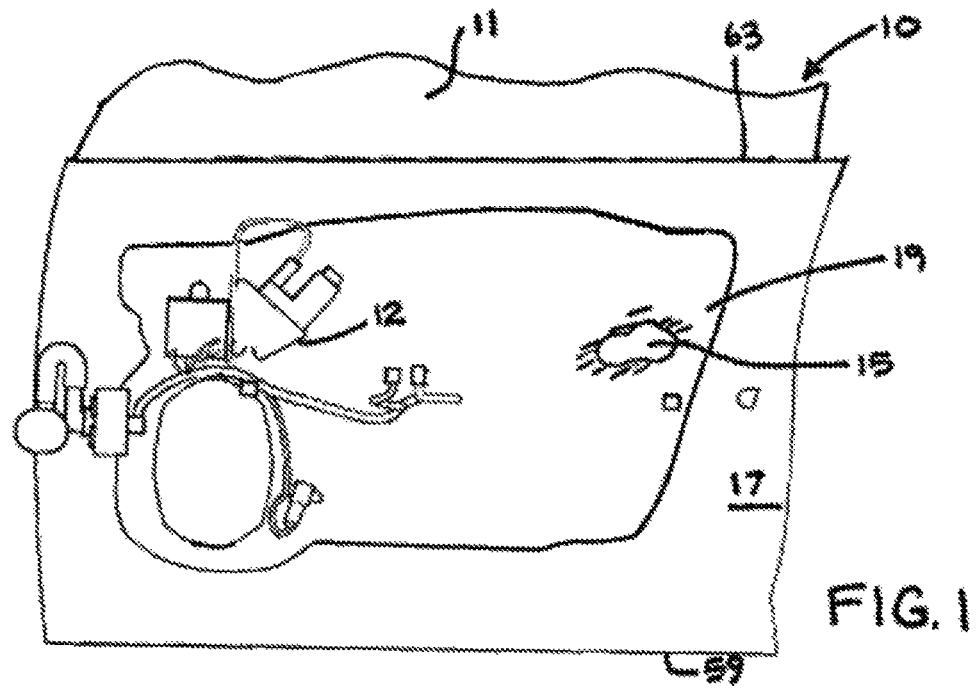
FIG. 1 illustrates a motor vehicle door assembly having at least one lifter plate assembly providing adjustment of a window in accordance with an aspect of the disclosure.

An example embodiment of a motor vehicle closure panel, adjustable lifter plates and/or adjustable window regulator rails therefor will now be described more fully with reference to the accompanying drawings. To this end, the example embodiment of a lifter plate and window regulator rails is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 3:
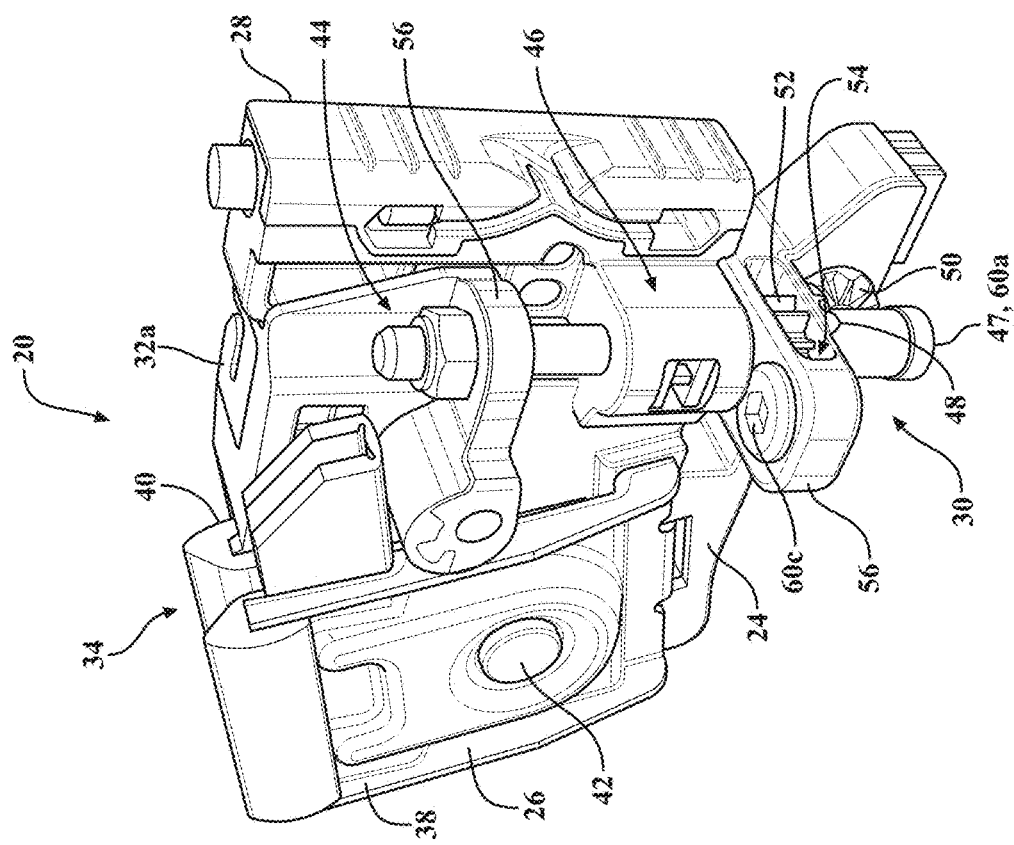
FIG. 3 illustrates an assembled view of the lifter plate assembly of FIG. 2.

Reference is made to FIG. 1, which shows a motor vehicle door assembly 10 having a window regulator assembly 21 (FIG. 1A) for moving a vehicle window 11 up and down, in accordance with a non-limiting embodiment of the present disclosure. The door assembly 10 includes an outer panel 15, an inner panel 17 (FIG. 3), and a door carrier module, shown as a frameless door carrier module, by way of example and without limitation, referred to hereafter simply as carrier 19. The window regulator assembly 21 may include a window regulator drive motor 12, one or more cables, shown by way of example and without limitation as a set of three drive cables 14a, 14b, 14c, a first window regulator rail 16, a second window regulator rail 18, and further includes a first window regulator lifter plate assembly 20 and a second window regulator lifter plate assembly 22 constructed in accordance with the disclosure, referred to hereafter in the singular as lifter plate assembly.

The drive motor 12 is mountable to carrier 19, wherein the carrier 19 is commonly fixed to the inner door panel 17 in spaced relation from outer door panel 15 of the door panel structure, or to some other suitable member of door assembly 10 in which the window 11 is disposed for movement along a vertically extending z-axis (Z) between open and closed positions. When the window 11 is raised to the closed position, a top edge 13 of the window 11 is brought into reliable sealed engagement with a roof (now shown) of the motor vehicle as a result of being able to adjust an assembled, raised position of the top edge 13 via adjustment of first lifter plate assembly 20 from a choice of three different adjustment locations, as discussed in more detail hereafter. The drive motor 12 drives upward and downward vertical movement of the respective first and second window regulator lifter plate assemblies 20, 22 along the respective first and second window regulator rails 16, 18 via driven movement of the drive cables 14a, 14b and 14c.

The first and second lifter plate assemblies 20, 22 are coupled to the first and second window regulator rails 16, 18, respectively, for vertical movement therealong in response to energization of drive motor 12 and corresponding movement of drive cables 14a, 14b, 14c. Referring to FIGS. 2-6, the first lifter plate assembly 20 includes a main body, also referred to as base 24, a lifter plate, also referred to as window holder 26, a nipple housing, also referred to as cable holder 28, and a height adjustment mechanism 30.

Figure 1A:
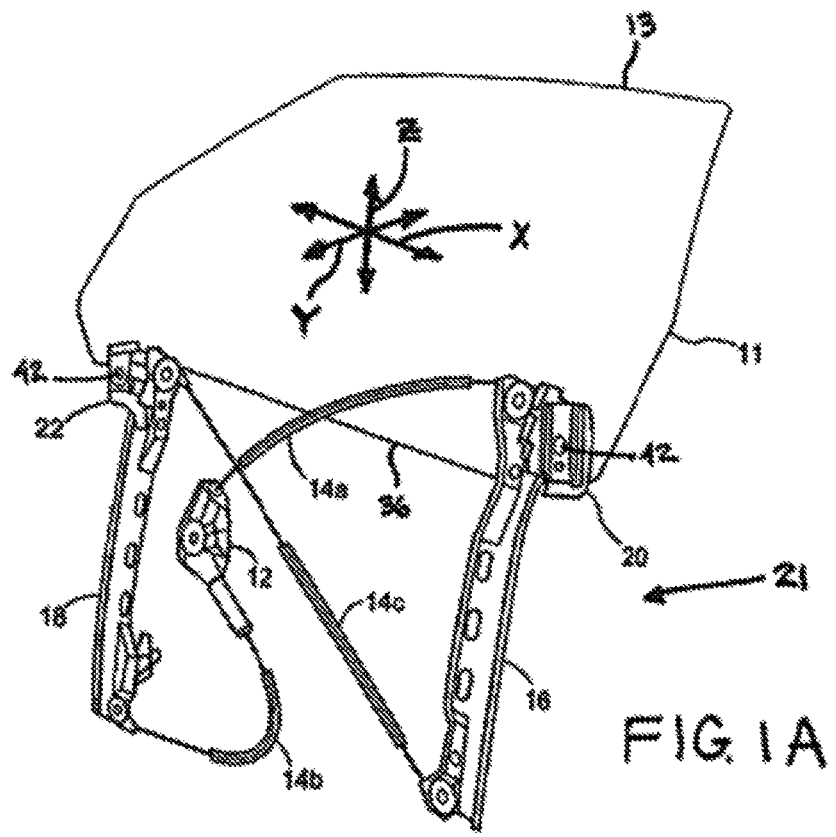
FIG. 1A illustrates the motor vehicle door assembly of FIG. 1 with inner and outer door panels removed therefrom to illustrate window regulator rails and the at least one lifter plate assembly supported for movement thereon.

As best seen in FIG. 8C, base 24 includes upper and lower rail guides 32a, 32b, respectively, for mounting to the window regulator rails 16, 18 (FIG. 1) while permitting sliding movement therewith. In this way, the base 24 is configured for movement along the rail 16 (FIG. 1A).

The configuration of the window regulator rails 16, 18 (FIG. 1A) and the rail guides 32a, 32b (FIG. 8C) may be any suitable configuration. For example, the engagement portion of the regulator rails 16, 18 (i.e. the portion of the regulator rails 16, 18 that is engaged by the rail guides 32a, 32b) may be generally L-shaped in cross section, and the rail guides 32a, 32b may have a generally L-shaped slot to accommodate the engagement portion of the regulator rails 16, 18 for slidable movement therebetween. This inhibits the inadvertent disengagement of the base 24 from the respective regulator rails 16, 18, while permitting the desire movement of rail guides 32a, 32b along rails 16, 18.

The base 24 may be made from any suitable material or combination of materials, such as, for example, Aluminum, polymeric material or combination thereof.

The window holder 26 is configured to receive and hold the vehicle window 11 in fixed relation therein. In the embodiment shown, the window holder 26 is generally U-shaped, thereby providing a pocket, also referred to as receptacle, channel or slot 34, configured for captured receipt of a bottom edge 36 (FIG. 1A) of the vehicle window 11 therein. The window 11 may be secured in the window holder 26 in any suitable manner, such as, by way of example and without limitation, being constrained under a clamping force applied by drawing opposite walls 38, 40 of window holder 26 toward one another, such as via a window fastener 42, by way of example and without limitation.

Figure 2:
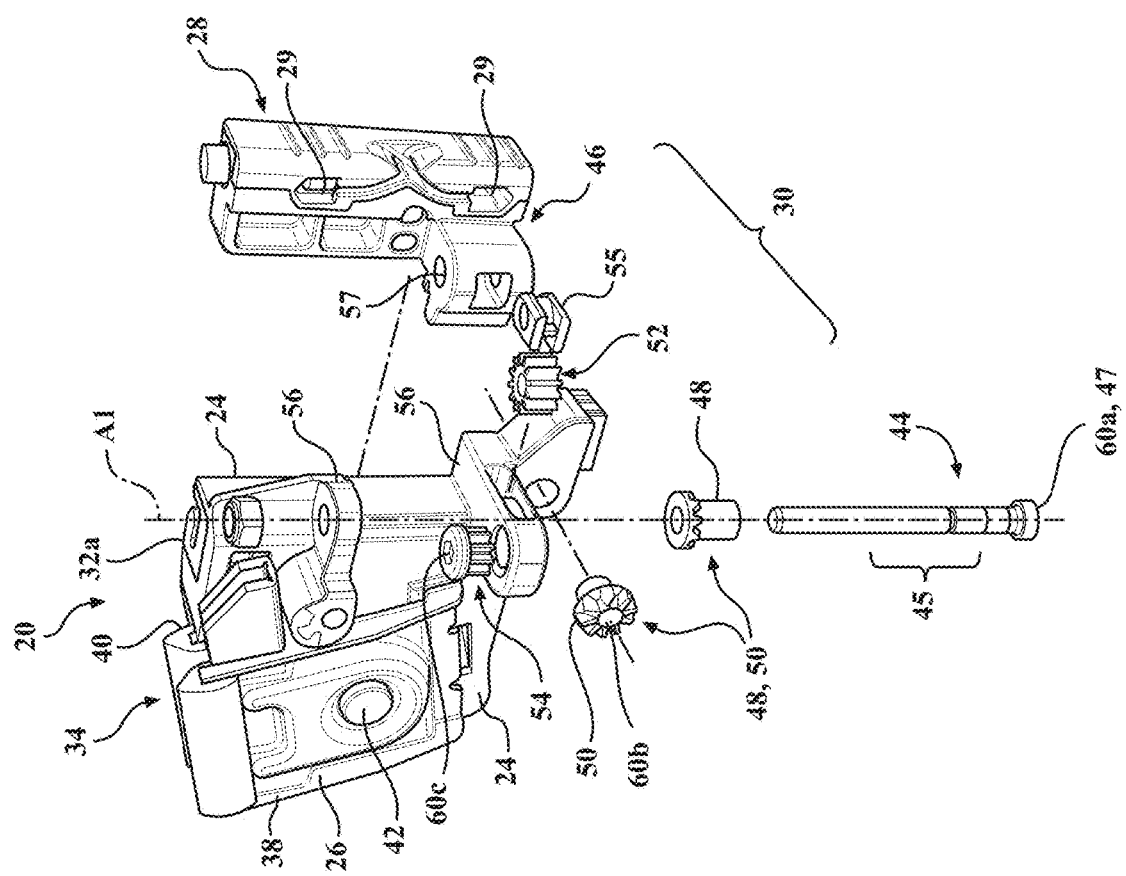
FIG. 2 illustrates an exploded view of the lifter plate assembly of the motor vehicle door assembly of FIG. 1 in accordance with one aspect of the disclosure.
Figure 4A:
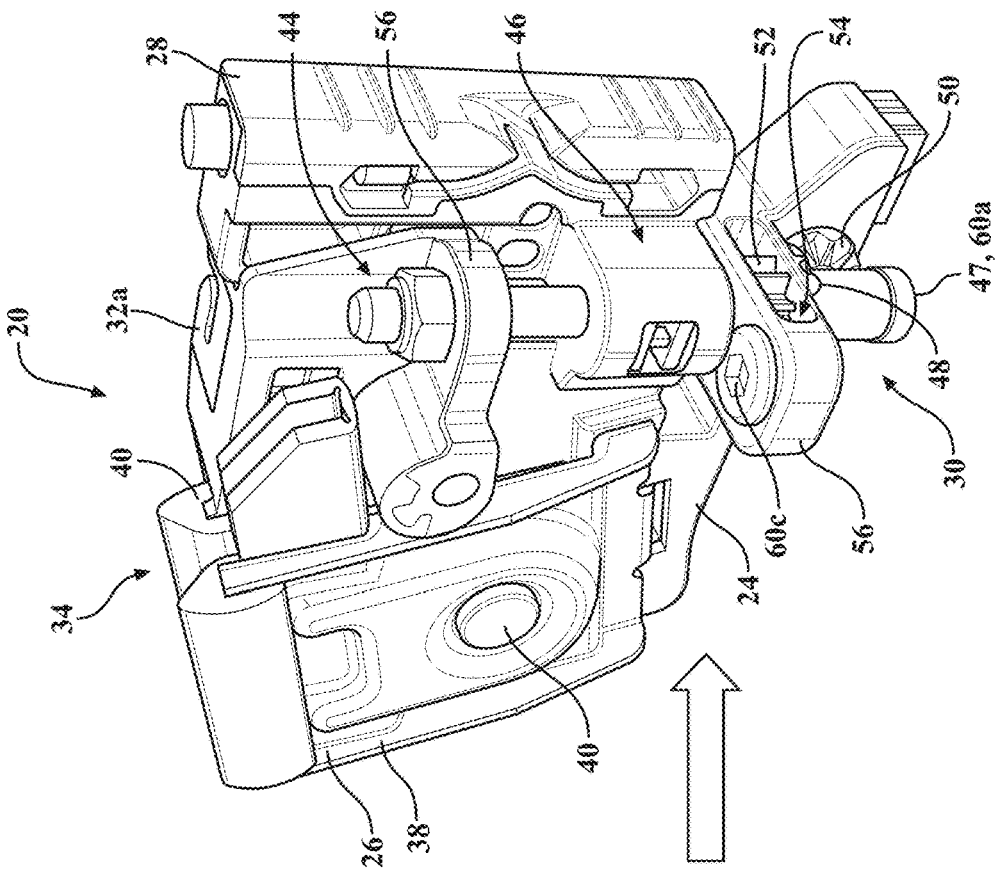
FIG. 4A is a view similar to FIG. 3 illustrating the lifter plate assembly being adjusted to move a window holder and window fixed thereto in an upward vertical direction.
Figure 4B:
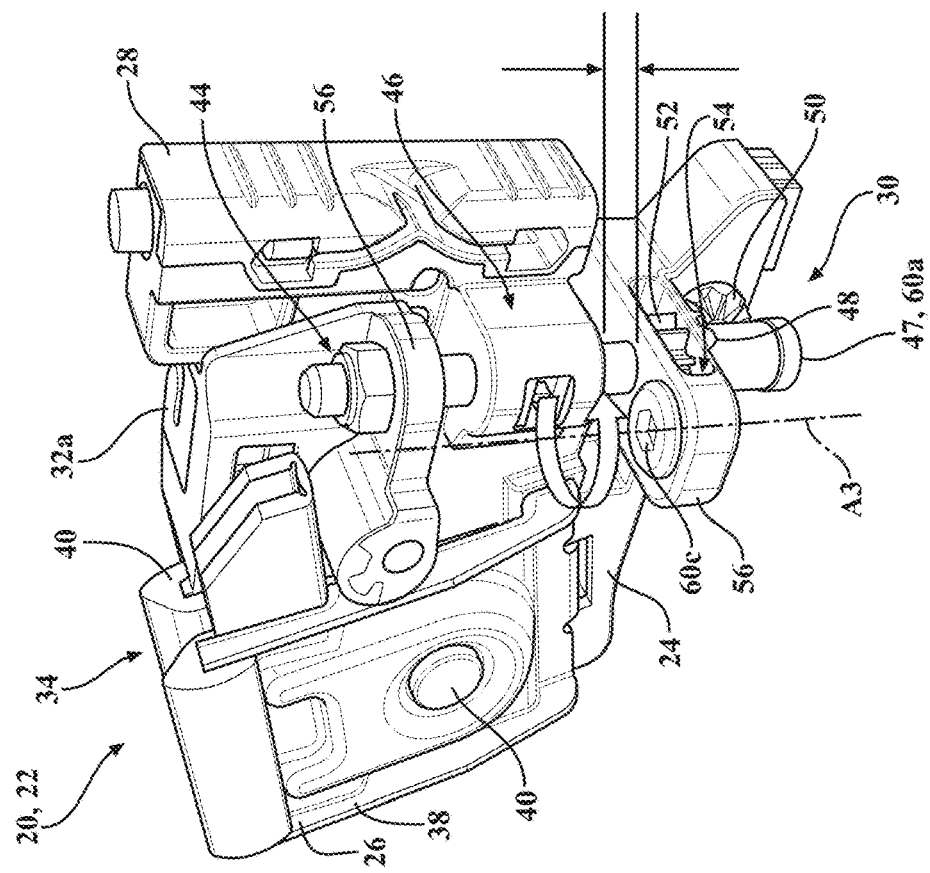
FIG. 4B is a view illustrating the window holder and window fixed thereto moved upward relative to a cable holder of the lifter plate assembly upon performing the adjustment of FIG. 4A.
Figure 5B:
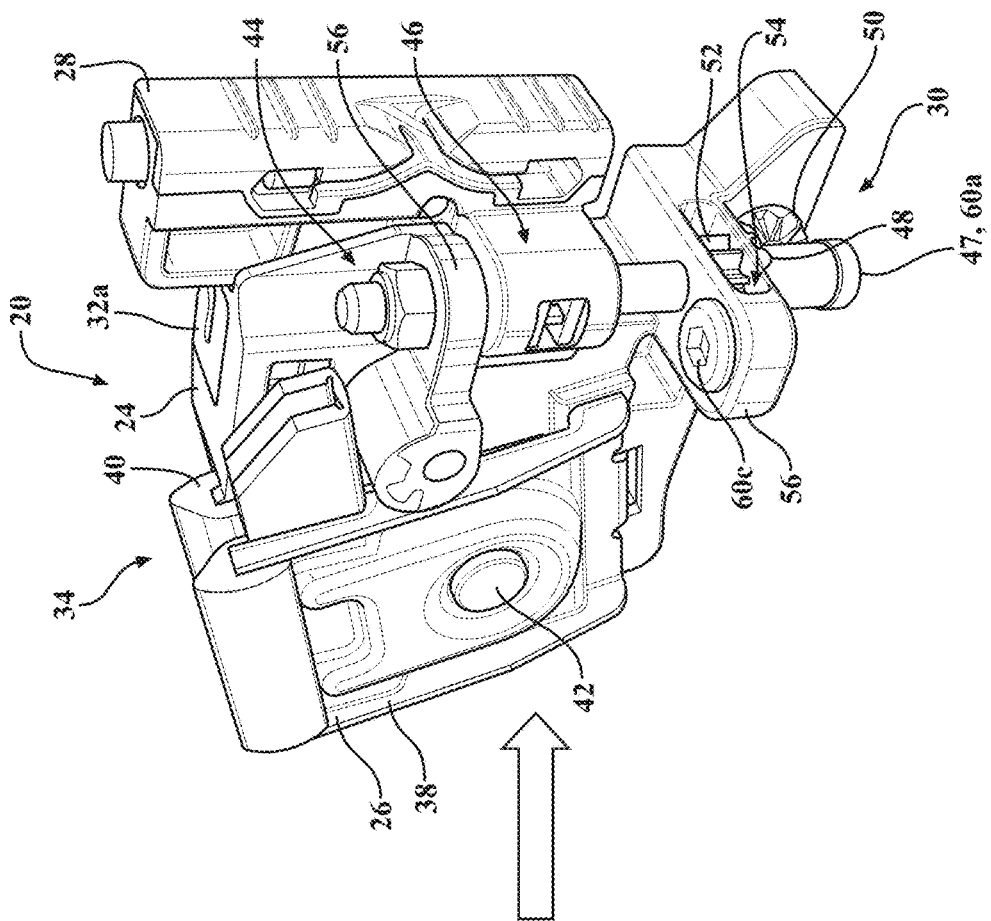
FIG. 5B is a view illustrating the window holder and window fixed thereto moved downward relative to a cable holder of the lifter plate assembly upon performing the adjustment of FIG. 5A.
Figure 5A:
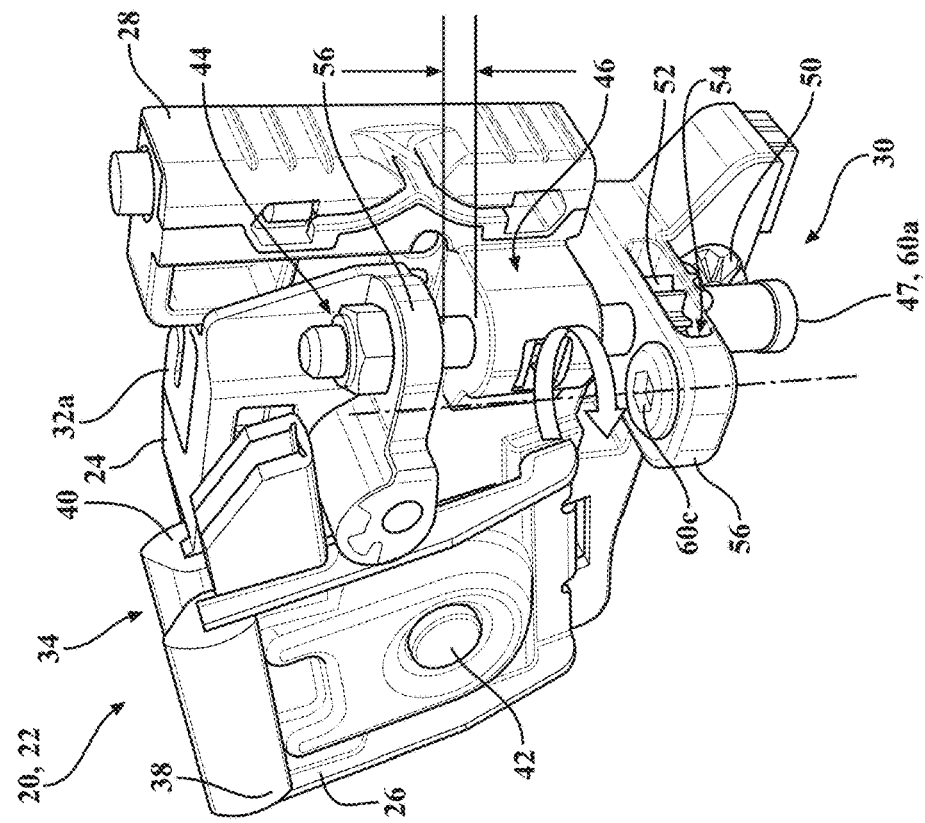
FIG. 5A is a view similar to FIG. 3 illustrating the lifter plate assembly being adjusted to move a window holder and window fixed thereto in a downward vertical direction.
Figure 6:
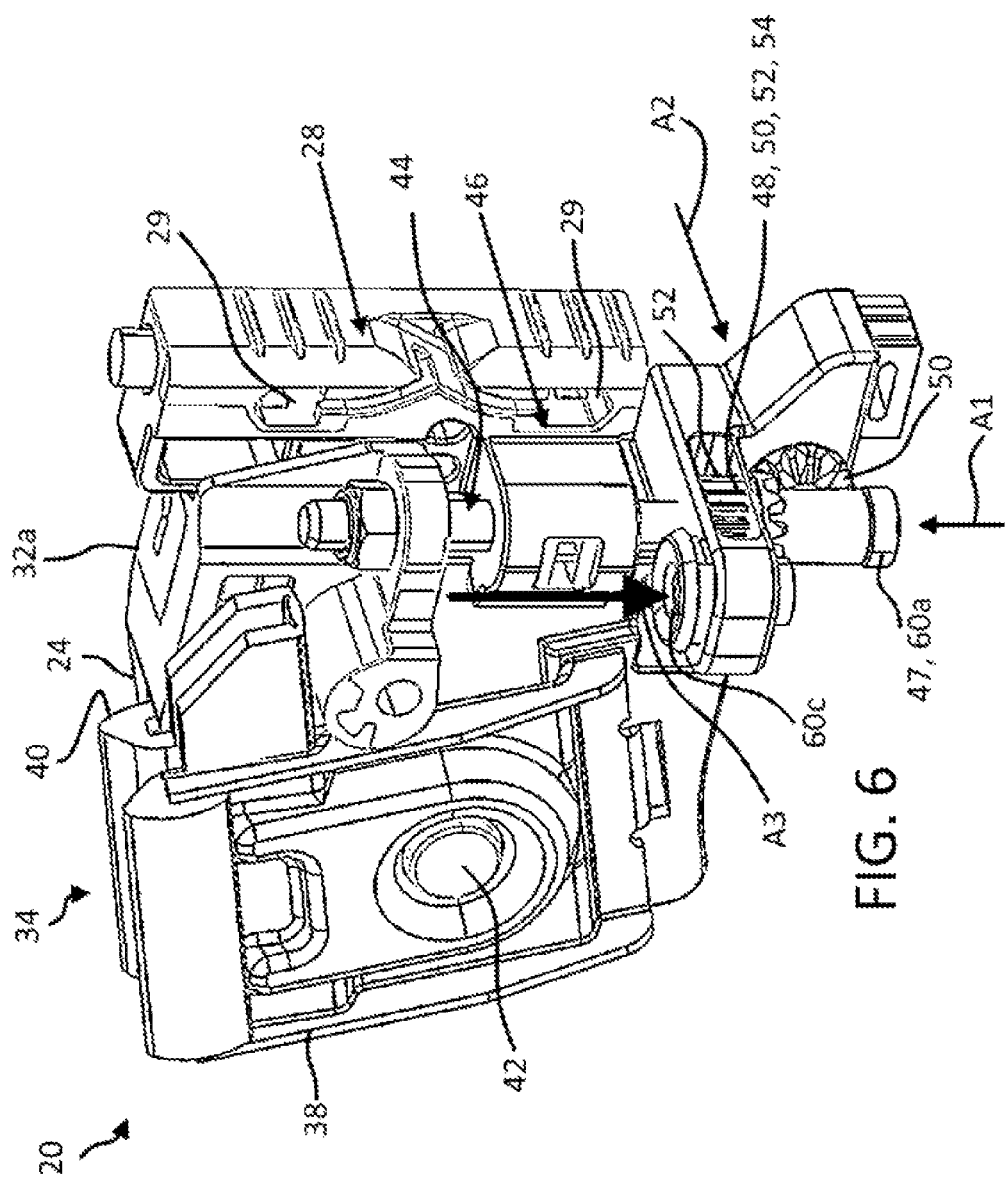
FIG. 6 is a view similar to FIG. 3 illustrating multiple adjustment features of the lifter plate assembly, with each adjustment feature being accessible from a different orientation to allow a tool to adjust the vertical position of the window holder relative to the cable holder from a different location in the motor vehicle door assembly.

As best shown in FIGS. 2 and 6, the cable holder 28 is configured for attachment to at least one cable (14a, 14b, 14c), and is shown being configured having cable receptacles 29 to retain the ends of the cables 14a and 14c (FIG. 1). The height adjustment mechanism 30 is used to adjust the height of the cable holder 28 and the base 24 (and window holder 26) relative to each other. The cable holder 28 may be made from any suitable material, such as a suitable polymeric material with a backing made from a metal, such as Aluminum, by way of example and without limitation. The height adjustment mechanism 30 includes a threaded rod 44 having a male threated region 45 (FIG. 2), a female threaded nut 46 (nut 46 may be made from any suitable material or combination of materials, such as of metal, polymeric materials and combinations thereof), a first gear 48, shown as a bevel gear by way of example and without limitation, a second gear 50, shown as a bevel gear by way of example and without limitation, a third gear 52, shown as a spur gear by way of example and without limitation, and a fourth gear 54, shown as a spur gear by way of example and without limitation. The threaded rod 44 is supported for rotation about a vertical rod axis A1 (FIG. 2) (corresponding to direction of a z-axis shown in FIG. 1A) by the base 24, and is shown as being rotatably supported by two spaced laterally extending flanges, also referred to as supports 56, on the base 24. The threaded region 45 of rod 44 is located between the supports 56, by way of example and without limitation. The threaded rod 44 may be made from a suitable material, such as a corrosion resistant metal, such as steel. The nut 46 includes an internally threaded region 57, which can be provided by an insert 55, if desired, that meshes with the threaded region 45 of the threaded rod 44. The nut 46 is fixed to the cable holder 28, and thus, when the threaded rod 44 is rotated, the base 24, with window holder 26 fixed thereto, translates conjointly with threaded rod 44 relative to the nut 46 and cable holder 28, which remain stationary, thereby adjusting the vertical positions of the window holder 26 and the cable holder 28 relative to each other. To facilitate rotating rod 44 to effect adjustment of height adjustment mechanism 30 from below (underneath) the height adjustment mechanism 30 (FIG. 8B), wherein it is contemplated that adjustment can be performed through an access opening in a bottom shut face 59 of the motor vehicle door assembly 10, such as may be desired toward an end of an assembly line and during service of the motor vehicle, rod 44 has a tool-receiving feature 60a at a bottom first end 47 of rod 44. Tool-receiving feature 60a faces the bottom shut face 59 of motor vehicle door assembly 10 and is configured to receive a tool 64 which can be extended through an opening in the bottom shut face 59 and used to rotate the rod 44 in a selected clockwise or counterclockwise direction about axis A1, depending on the nature of adjustment needed, which in turn causes translation of the threaded rod 44 relative to fixed nut 46, thereby adjustably raising or lowering (depending on the direction of rotation of rod 44) the top edge 13 of the window 11 to perfect a seal with the vehicle roof. For example, the mating threads of threaded region 45 of rod 44 and internally threaded region 57 of nut 46 can be configured to cause rod 44, with window holder 26 configured to move conjointly therewith, to translate downwardly along axis A1 when rod 44 is rotated clockwise via tool 64, and to translate upwardly along axis A1 when rod 44 is rotated counterclockwise via tool 64. The tool-receiving feature 60*a* may be configured to receive any suitable kind of tool. For example, the tool-receiving feature 60*a* may have a hex key pocket, also referred to as an Allen key pocket, configured to receive a standard hex key wrench, also referred to as an Allen wrench.

The first gear 48 is fixed for conjoint rotation with threaded rod 44 in coaxial rotation therewith about axis A1, wherein the threaded rod 44 extends through a central bore of the first gear 48 such that the gear teeth of the first gear 48 extend annularly and concentrically about the rotational axis A1 of threaded rod 44. In a non-limiting embodiment, first gear 48 is illustrated fixed adjacent bottom first end 47 of the threaded rod 44. The second gear 50 is contained for rotation in the base 24 and about a rotational axis A2 that is inclined relative to rotational axis A1, and in the non-limiting embodiment, rotational axis A2 (corresponding to a direction of a cross-vehicle y-axis shown in FIG. 1A) extends generally transversely to the rotational axis A1 of rod 44 and first gear 48. The second gear 50 has gear teeth that are configured in meshed engagement with the gear teeth of the first gear 48. The second gear 50 has an accessible tool-receiving feature 60*b*, which is accessible along axis A2 from an inboard side 62 of the base 24 (FIG. 8C). With tool-receiving feature 60*b* facing and being accessible from the inboard side 62 of the base 24, it is contemplated that the tool 64 can be disposed through an access opening in inner door panel 17 of the motor vehicle door assembly 10 and extending along axis A2 into engagement with tool-receiving feature 60*b* to rotate second gear 50 about axis A2 and effect adjustment of the height adjustment mechanism 30. The tool-receiving feature 60*b* is configured to receive a tool which can be used to rotate the second gear 50 in a selected clockwise or counterclockwise direction, which in turn drivingly rotates the first gear 48 in a corresponding and respective counterclockwise (FIG. 4A) or clockwise direction (FIG. 5A) to cause rotation and translation of the threaded rod 44 in the desired respective direction along axis A1, thereby adjustably raising (FIG. 4B) or lowering (FIG. 5B) the top edge 13 of the window 11 to perfect a seal with the vehicle roof. The tool-receiving feature 60*b* may be configured to receive any suitable kind of tool, and advantageously, can be configured to receive the same tool 64 used to rotate rod 44 via tool-receiving feature 60*a*. This would permit an assembly line worker to use the same tool, for both tool-receiving features 60*a*, 60*b*.

The third gear 52 is fixed for conjoint rotation to threaded rod 44 in coaxial rotation therewith, wherein the threaded rod 44 extends through a central bore of the third gear 52 such that the gear teeth of the third gear 52 extend annularly and concentrically about the rotational axis A1 of threaded rod 44. In a non-limiting embodiment, third gear 52 is illustrated fixed immediately adjacent first gear 48, and is further shown position above first gear 48, by way of example and without limitation. The fourth gear 54 is contained for rotation in the base 24 and about a rotational axis A3 that is inclined relative to rotational axis A2, and in the non-limiting embodiment is generally transverse to rotational axis A2, (corresponding to a direction of a z-axis shown in FIG. 1A) that extends in spaced and generally parallel relation to the rotational axis A1 of rod 44 and first gear 48. It is to be understood that rotational axes A1 and A3 could be inclined relative to one another, if desired. The fourth gear 54 has gear teeth that are configured in meshed engagement with the gear teeth of the third gear 52, and as noted above, the meshed gear teeth can be provided as spur gear teeth, though other suitable configurations of gear teeth are contemplated, as will be appreciated and understood by a person possessing ordinary skill in the art of meshed gears. The fourth gear 54 has an accessible tool-receiving feature 60*c*, which is accessible from above the height adjustment mechanism 30, such as at a belt line 63 of the motor vehicle door assembly 10 (FIG. 8A). With tool-receiving feature facing and being accessible from above the height adjustment mechanism 30, it is contemplated that the tool 64 can be disposed through an access opening between the window 11 and the inner 17 or outer panel 15 of the motor vehicle door assembly 10 to effect adjustment of the height adjustment mechanism 30, by way of example and without limitation. The tool-receiving feature 60*c* is configured to receive a tool which can be used to rotate the fourth gear 54 in a selected clockwise or counterclockwise direction, which in turn rotates the third gear 52 in a corresponding and respective counterclockwise or clockwise direct to cause corresponding rotation and translation of the threaded rod 44 in the desired direction along axis A1, thereby adjustably raising or lowering the top edge 13 of the window 11 to perfect a seal with the vehicle roof. The tool-receiving feature 60*c* may be configured to receive any suitable kind of tool, and advantageously, can be configured to receive the same tool 64 used to rotate rod 44 via tool-receiving feature 60*a*. This would permit an assembly line worker to use the same tool, for all tool-receiving features 60*a*, 60*b*, 60*c*. Furthermore, the assembly line worker could use any of the tool-receiving features 60*a*, 60*b*, 60*c* depending on the position of the lifterplate during assembly, and without having to move the lifterplate to an accessible portion by the tool 64 prior to adjustment. For example if the assembly line worker adjusts the lifterplate when the window is in the full closed position, tool-receiving feature 60*c* could be used. For example if the assembly line worker adjusts the lifterplate when the window is in a short drop position, tool-receiving feature 60*b* could be used. For example if the assembly line worker adjusts the lifterplate when the window is in a lowered position, tool-receiving feature 60*a* could be used.

Figure 9:
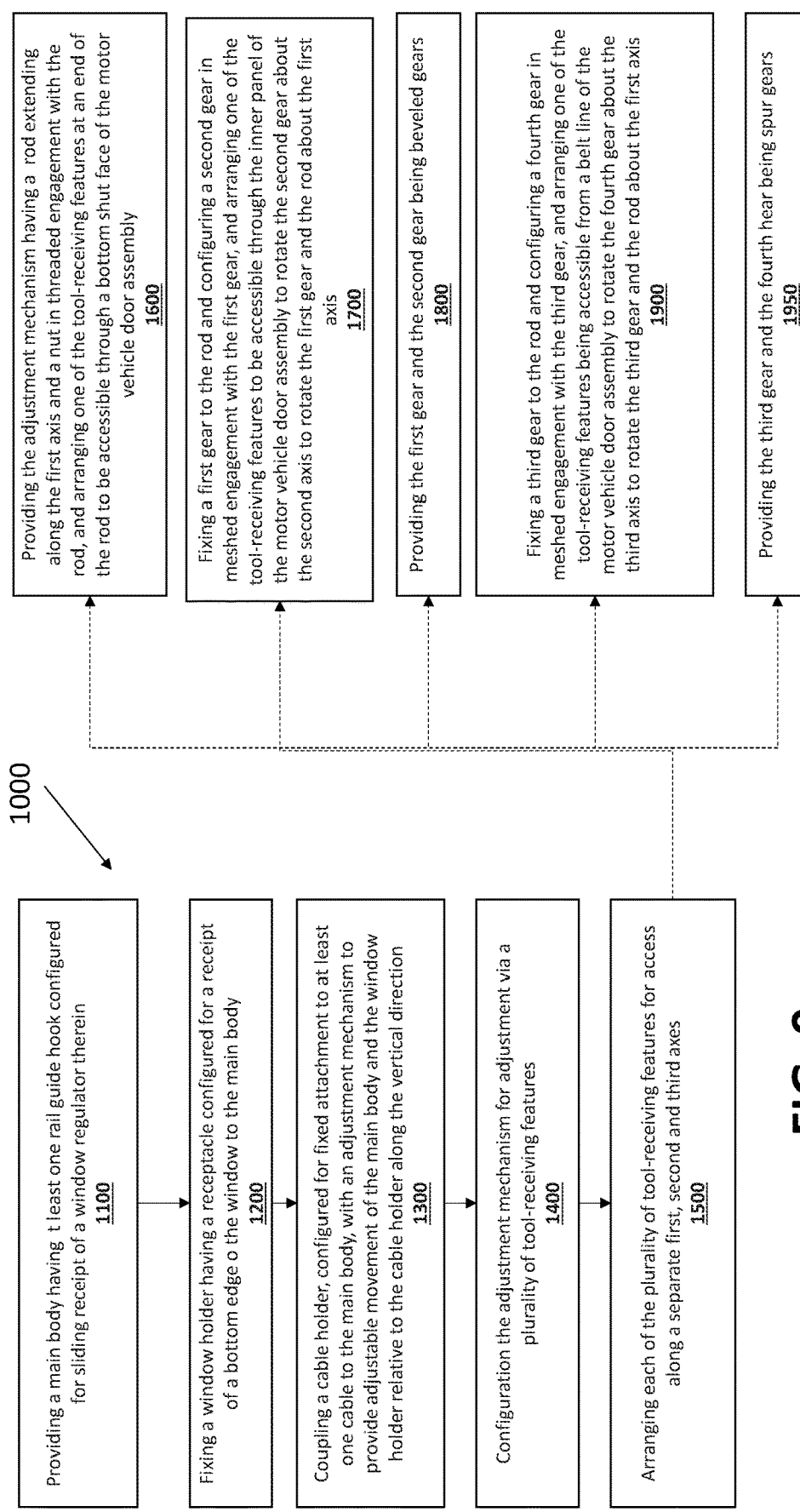
FIG. 9 is a flow diagram illustrating a method of constructing a lifter plate assembly for holding a window of a motor vehicle door assembly and facilitating adjustable movement of the window along a vertical direction to bring a top edge of the window into sealed engagement with roof of the motor vehicle.

In accordance with another aspect of the disclosure, as shown in FIG. 9, a method 1000 of constructing a lifter plate assembly 20 for holding a window 11 of a motor vehicle door assembly 10 and facilitating adjustable movement of the window 11 along a vertical direction to bring a top edge 13 of the window 11 into sealed engagement with roof of the motor vehicle is provided. The method 1000 includes a step 1100 of providing a main body 24 having at least one rail guide hook 32*a*, 32*b* configured for sliding receipt of a window regulator rail 16, 18 therein. Further, a step 1200 of fixing a window holder having a receptacle 34 configured for receipt of an edge 36 of the window 11 to the main body 24. A further step 1300 includes coupling a cable holder 28 configured for fixed attachment to at least one cable 14*a*, 14*b*, 14*c* to the main body 24 with an adjustment mechanism 30 to provide adjustable movement of the main body 24 and the window holder 26 relative to the cable holder 28 along the vertical direction. Further yet, a step 1400 of configuring the adjustment mechanism 30 for adjustment via a plurality of tool receiving features 60*a*, 60*b*, 60*c*, and a step 1500 of arranging each of the plurality of tool receiving features 60*a*, 60*b*, 60*c* being accessible along a separate first, second and third axes A1, A2, A3.

In accordance with a further aspect, the method 1000 can include a step 1600 of providing the adjustment mechanism 30 having a rod 44 extending along the first axis A1 and a nut 46 in threaded engagement with the rod 44, and arranging one of the adjustment features 60*a* at an end 47 of the rod 44 to be accessible through a bottom shut face 59 of the motor vehicle door assembly 10.

In accordance with a further aspect, the method 1000 can include a step 1700 of fixing a first gear 48 to the rod 44 and configuring a second gear 50 in meshed engagement with the first gear 48, and arranging one of the adjustment features 60*b* to be accessible through an inner panel 17 of the motor vehicle door assembly 10 to rotate the second gear 50 about the second axis A2 to rotate the first gear 48 and the rod 44 about the first axis A1.

In accordance with a further aspect, the method 1000 can include a step 1800 of providing the first gear 48 and the second gear 50 being beveled gears.

In accordance with a further aspect, the method 1000 can include a step 1900 of fixing a third gear 52 to the rod 44 and configuring a fourth gear 54 in meshed engagement with the third gear 52, and arranging one of the tool receiving features 60*c* being accessible from a belt line 63 of the motor vehicle door assembly 10 to rotate the fourth gear 54 about the third axis A3 to rotate the third gear 52 and the rod 44 about the first axis A1.

In accordance with a further aspect, the method 1000 can include a step 1950 of providing the third gear 52 and the fourth gear 54 being spur gears.

Figure 10:
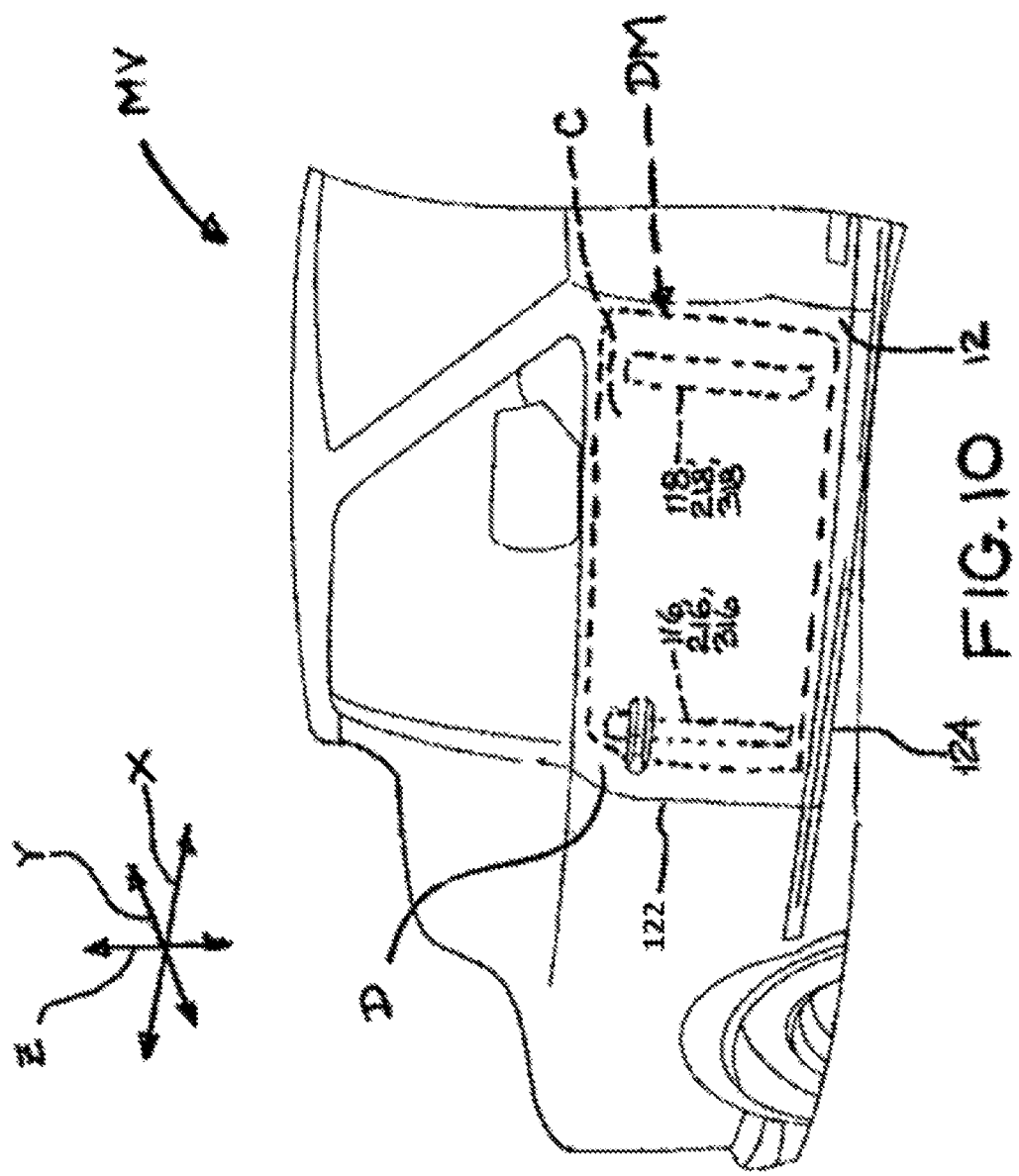
FIG. 10 illustrates a motor vehicle equipped with a vehicle door having a door module constructed according to the present disclosure.
Figure 11:
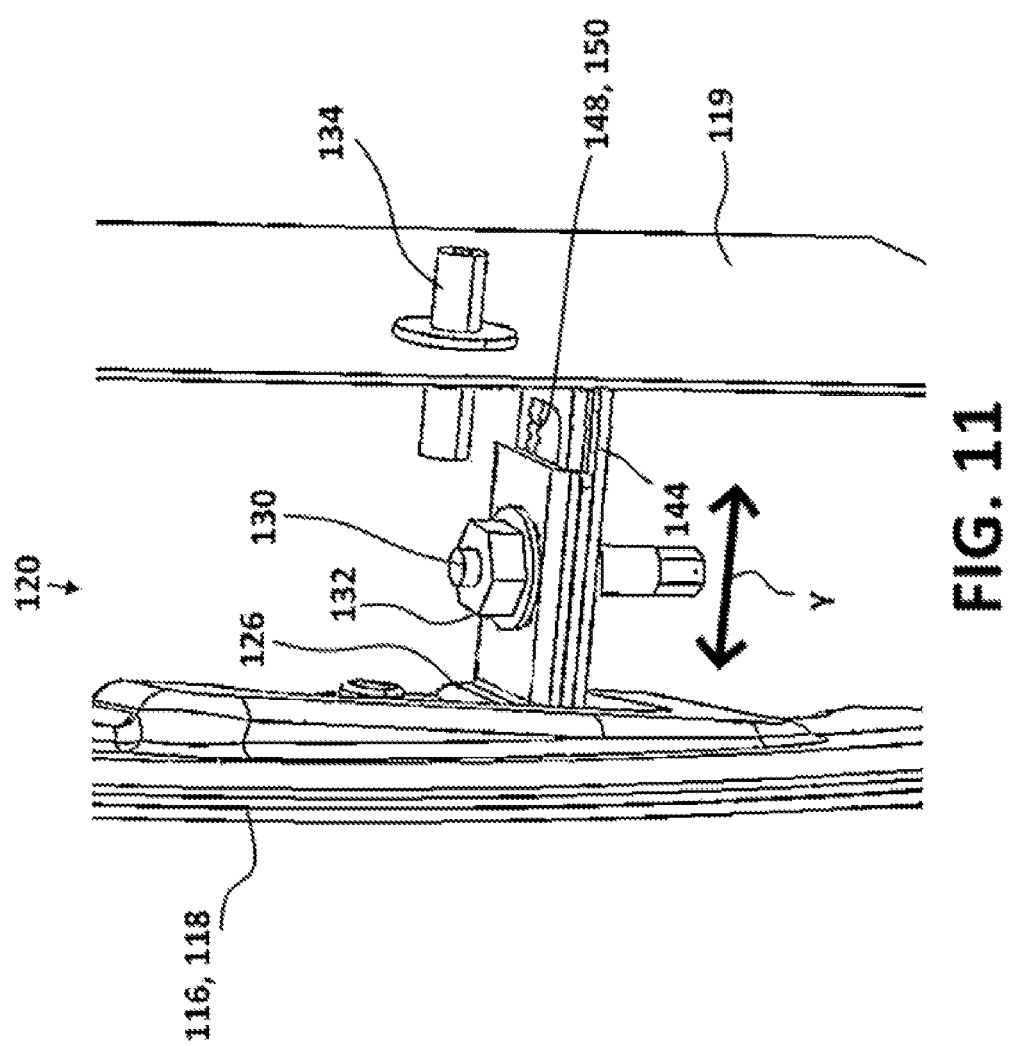
FIG. 11 is a partial perspective view of a window regulator rail and carrier of the door module of FIG. 10, with a window regulator rail adjustment mechanism constructed according to one aspect of the present disclosure therebetween to effect adjustable movement of the window regulator rail relative to the carrier in a cross-vehicle direction.

Referring to FIG. 10, a door carrier module, shown as a frameless door carrier module, by way of example and without limitation, referred to hereafter simply as carrier 119, provided. Carrier 119 can be constructed to carry/support various door and/or window components, such as discussed above for carrier 19. In particular, carrier 119 is illustrated supporting first and second window regulator rails 116, 118 constructed in accordance with the disclosure, though it is contemplated herein that the first and second window regulator rails 116, 118 could be operably fixed to another support structure within an internal cavity C of a vehicle door D of a motor vehicle MV, if desired. As discussed in more detail hereafter, first and second window regulator rails 116, 118 are constructed to allow adjustment of a window 111 in a cross-vehicle direction, referred to hereafter as a Y-direction, via access to an adjustment mechanism 120 with a tool along at least one of an X-direction (direction extending along a length of the motor vehicle MV) or a Z-direction (direction extending vertically from a bottom of the motor vehicle MV to a top of the motor vehicle VM). Access along the X-direction can be facilitated via insertion of the tool through an opening in a generally vertically extending side panel, also referred to as side shut face 122 of the vehicle door D, and access along the Z-direction can be facilitated via insertion of the tool through an opening in a generally horizontal floor, also referred to as bottom shut face or bottom panel 124, of the vehicle door D.

Figure 12:
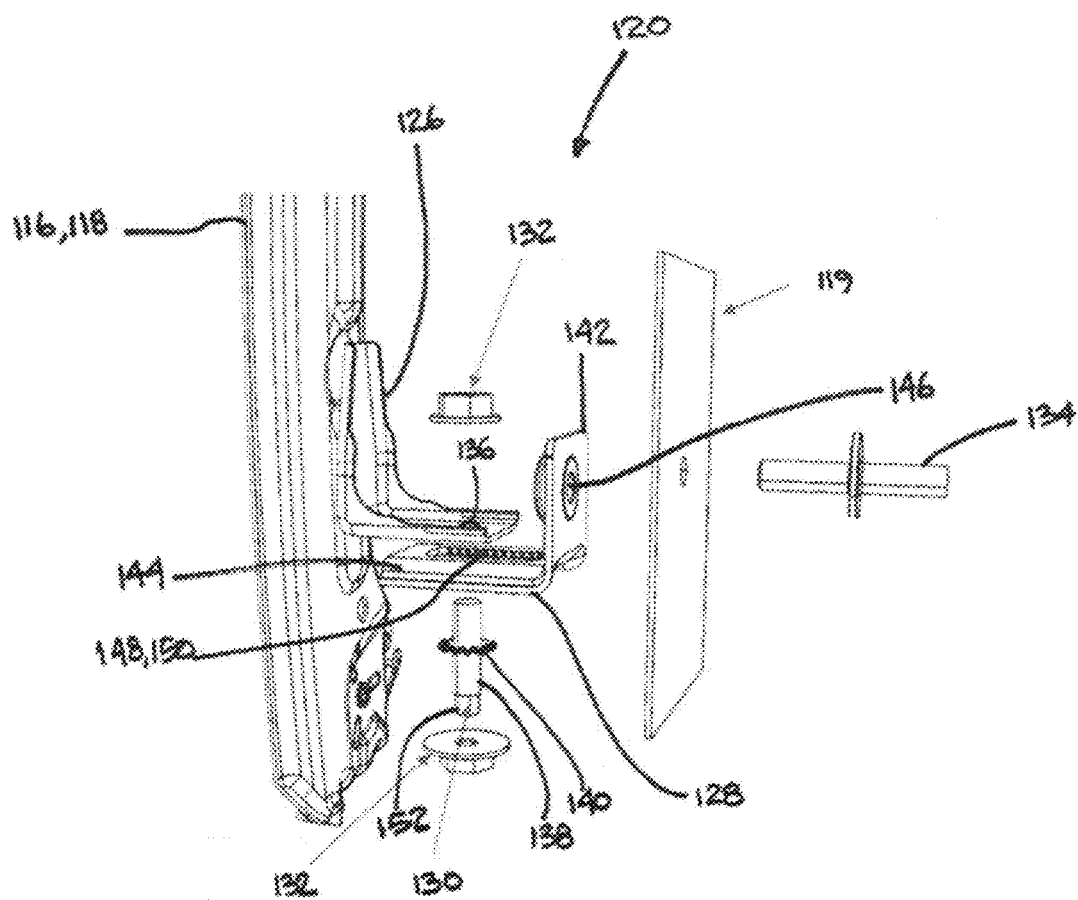
FIG. 12 is an exploded view of FIG. 11.

As best illustrated in FIG. 12, adjustment mechanism 120 includes a gear support member or plate, also referred to as mount bracket, and referred to hereafter as flange 126, a toothed rack, also referred to as rack member 128, a gear member, also referred to a pinion shaft 130, and fastener members, shown as a pair of nuts 132. Further illustrated is a fastener 134 for fixation of the adjustment mechanism 120 to the carrier 119, wherein the fastener 134 can be provided as any desired, screw, bolt, rivet, by way of example and without limitation.

The flange 126 can be fixedly attached to the first and second window regular rails 116, 118, as desired, such as via any suitable fixation mechanism, weld joint, fastener, adhesive, or the like. Otherwise, as illustrated in FIGS. 7-9, flange 226 can be formed as a monolithic piece of material with the first and second window regular rails 216, 218, if desired. Regardless, the flange 126 has a through opening 136 sized for a slight clearance fit of the pinion shaft 130 therethrough, such that the pinion shaft 130 extends lengthwise along an axis A extending in the Z-direction.

The pinion shaft 130 has a threaded shank 138 extending along the Z-direction with external male threads at each end for threaded fixation to the separate fasteners, shown as female threaded nuts 132. A gear 140 is fixed to and extends radially outwardly from the threaded shank 138 for meshed engagement with the rack member 128.

Figure 13B:
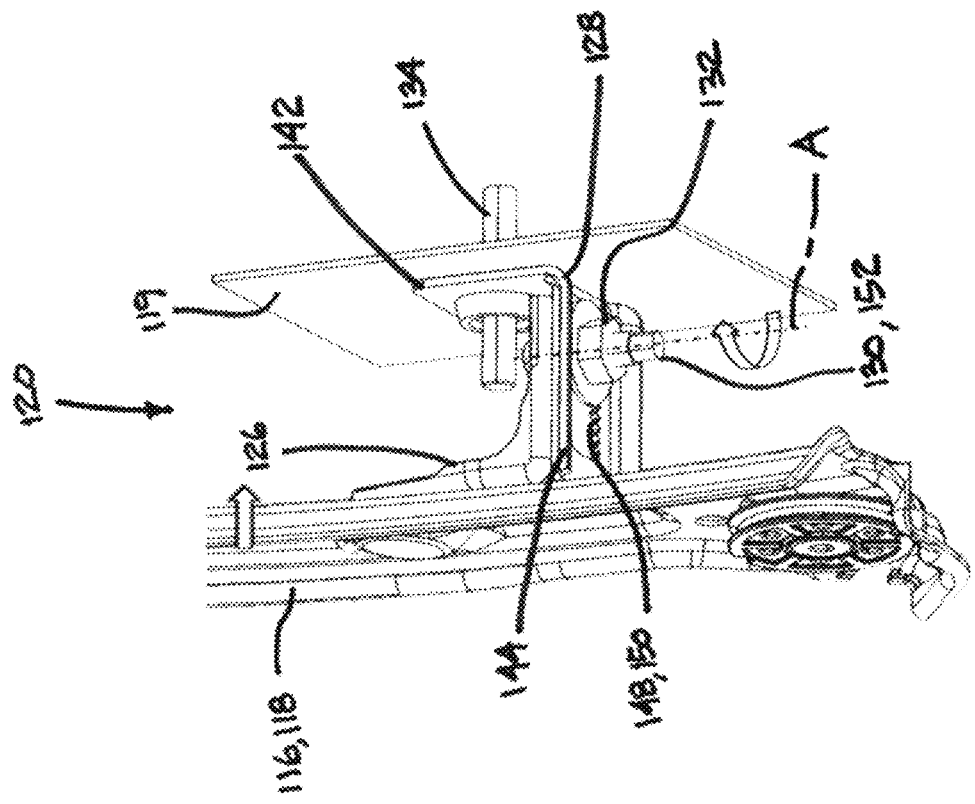
FIG. 13B illustrates the window regulator rail adjusted inwardly relative to the carrier.
Figure 13A:
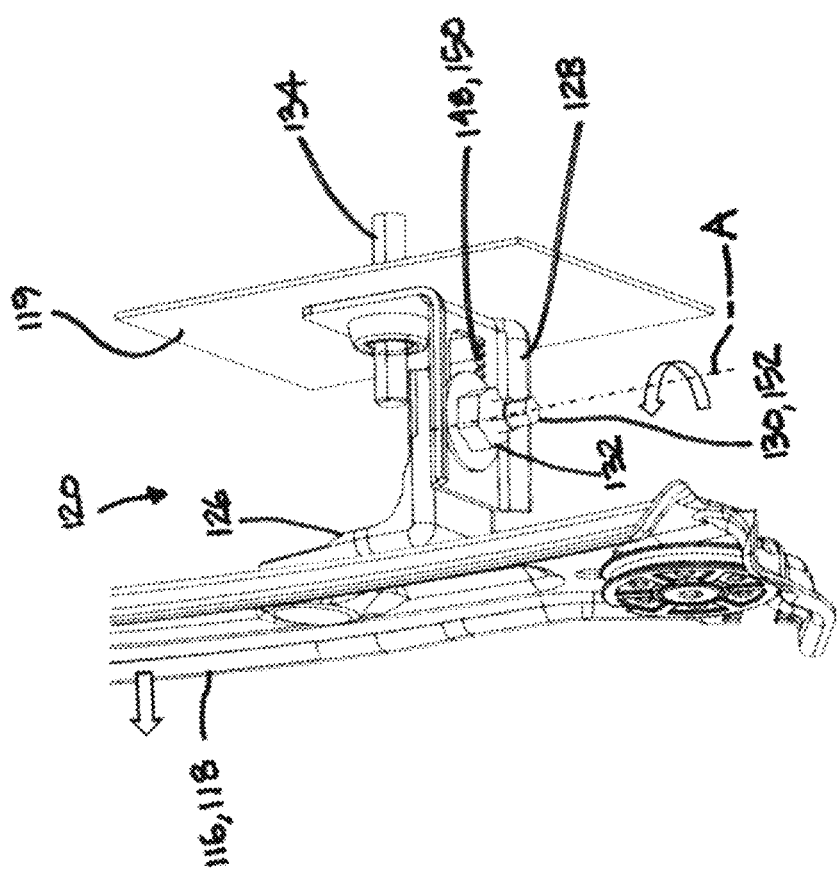
FIG. 13A illustrates the window regulator rail adjusted outwardly relative to the carrier.
Figure 14:
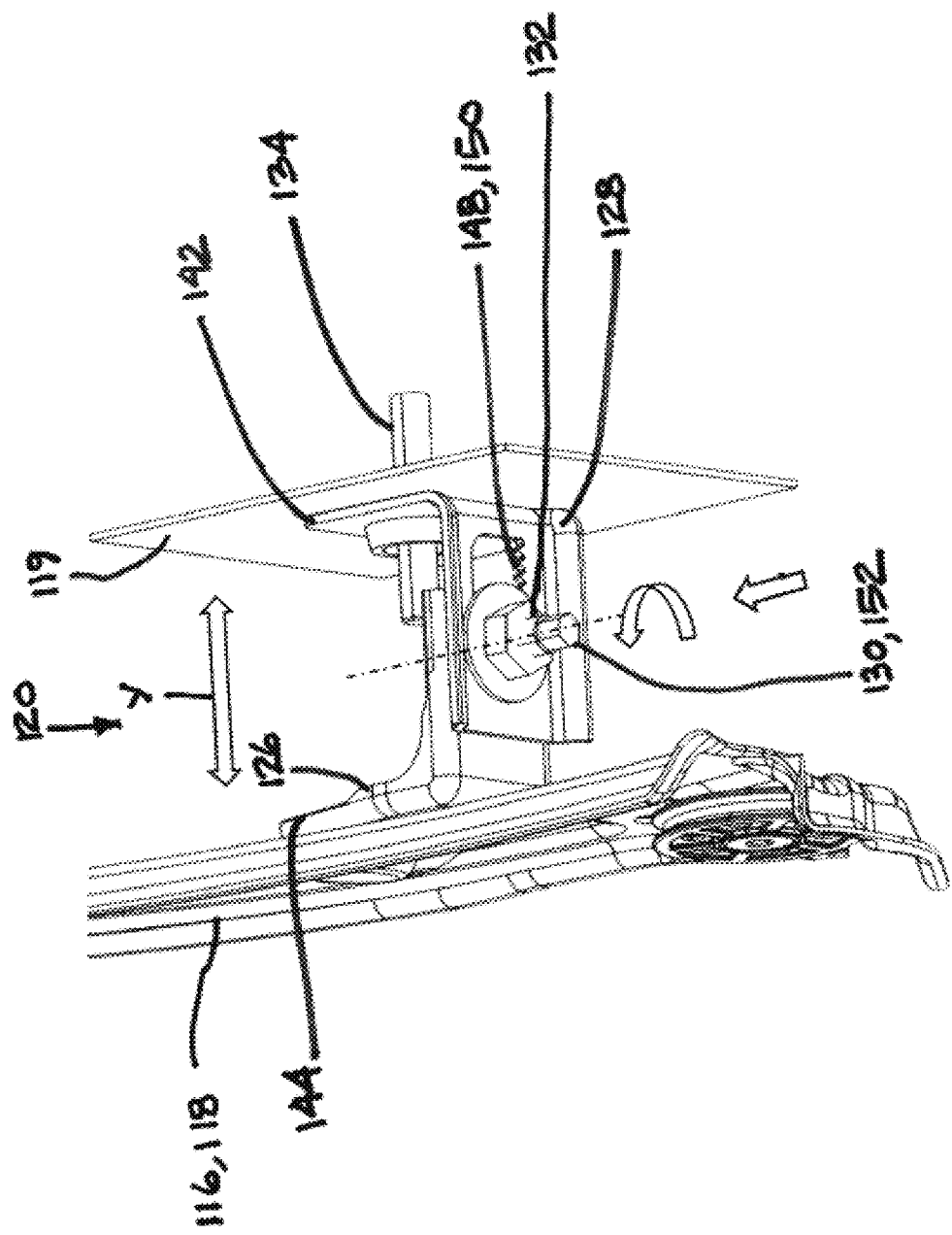
FIG. 14 is similar to FIG. 13A, further illustrating a direction of tool insertion for adjustment the window regulator rail adjustment mechanism.

The rack member 128 is shown as being generally L-shaped, by way of example and without limitation, having a mount portion 142 and a rack portion 144 extending in inclined relation from one another. The mount portion 142 can be provided having a through opening 146 for receipt of the fastener 134 therein to facilitate fixing the rack member 128 to the carrier 119. It is contemplated herein that mount portion 142 can be fixed to carrier 119 via a suitable fixation mechanism, including a weld joint or adhesive, for example. The rack portion 144 has a plurality of rack teeth 148 configured for meshed engagement with the gear 140. Rack teeth 148 are shown, by way of example and without limitation, as being formed to extend along the Y-direction alone one side of an elongate slot 150, such that rotation of gear 140 in a first direction (clockwise in FIG. 13A), via rotation of the pinion shaft 130, causes the teeth of the gear 140 to roll along the rack teeth 148, thereby causing the flange 126, with window regulator rail 116, 118 fixed thereto, to be driven by the pinion shaft 130 and to move in the Y-direction along a first direction, and such that rotation of gear 140 in a second direction (counterclockwise in FIG. 13B), via rotation of the pinion shaft 130, causes flange 126, with window regulator rail 116, 118 fixed thereto, to be driven by the pinion shaft 130 and to move in the Y-direction along a second direction, with the first and second directions being opposite one another. Accordingly, rotation of pinion shaft 130 in the desired clockwise or counterclockwise direction effects adjusted movement of the window regulator rail 116, 118 in the respective first or second cross-vehicle direction. The pinion shaft 130 can be rotated simply by a suitable tool having a configuration for mating engagement with an end portion 152 of the pinion shaft. Accordingly, the end portion 152 of pinion shaft 130 can have an outer tool receiving surface specifically contoured (hex-shaped, square, or otherwise) for receipt of a tool, and/or a female tool receiving receptacle extending into the end portion 152 and specifically contoured (hex-shaped, square, or otherwise) for receipt of a tool, as desired.

Prior to rotating the pinion shaft 130 to effect lateral adjustment of the window regulator rail 116, 118 in the cross-vehicle direction (Y-direction), the nut(s) 132 need to be loosened to bring the flange 126 out of clamped engagement with rack member 128. Once a nut(s) 132 is loosened, such as via a suitable tool, the pinion shaft 130 can be rotated with the tool in the desired direction to move the window regulator rail 116, 118 in the desired cross-vehicle direction.

Upon moving the window regulator rail 116, 118 to the desired position, the nut(s) 132 can be retightened with the tool to secure the window regulator rail 116, 118 in the adjusted position.

Figure 15:
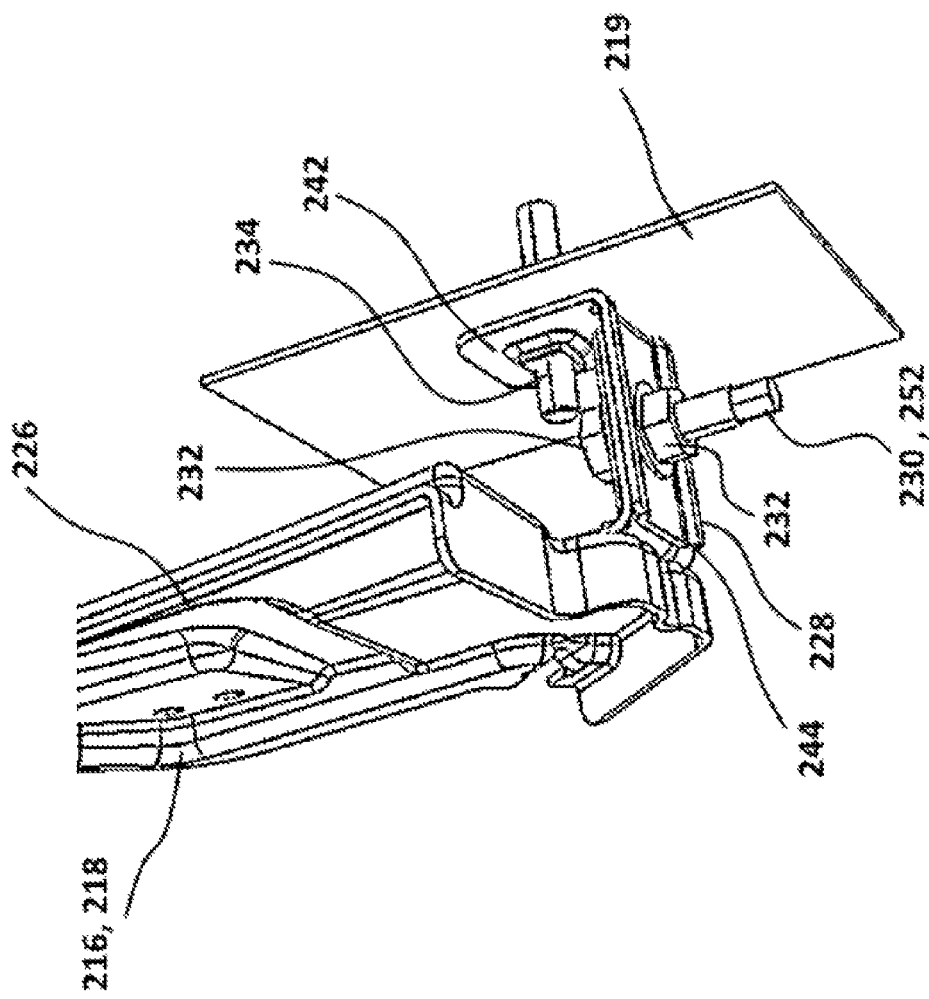
FIG. 15 is a partial perspective view of a window regulator rail and carrier of the door module of FIG. 10, with a window regulator rail adjustment mechanism constructed according to another aspect of the present disclosure therebetween to effect adjustable movement of the window regulator rail relative to the carrier in a cross-vehicle direction.
Figure 16:
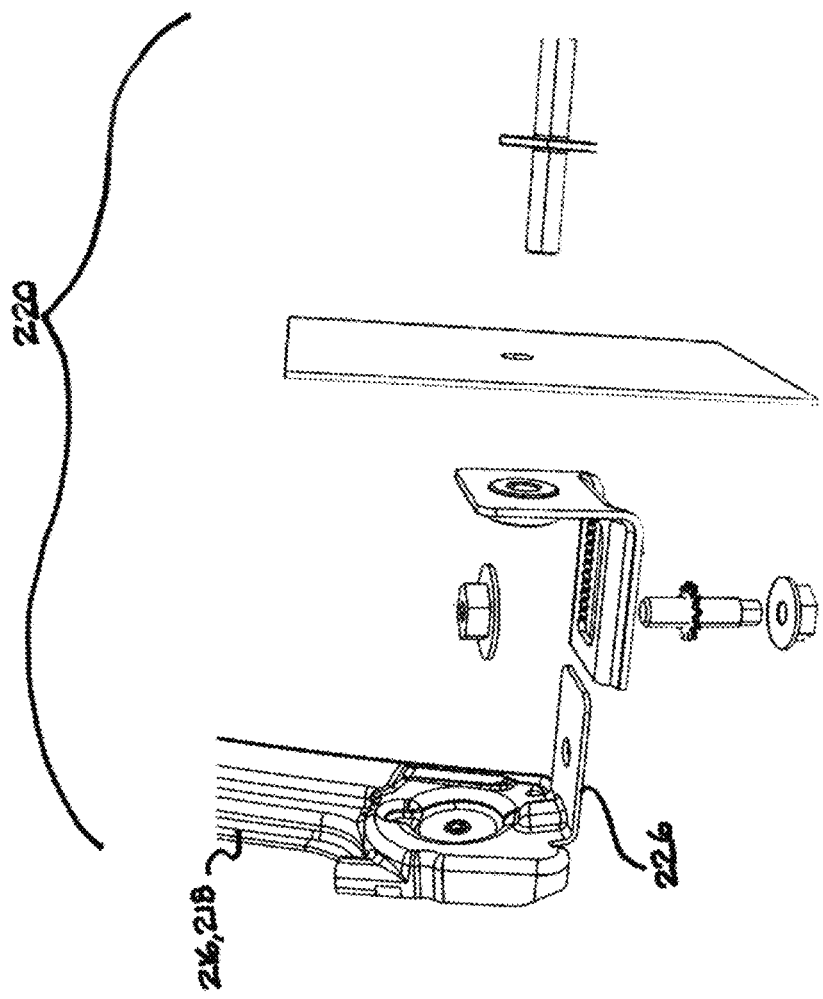
FIG. 16 is an exploded view of FIG. 15.
Figure 16A:
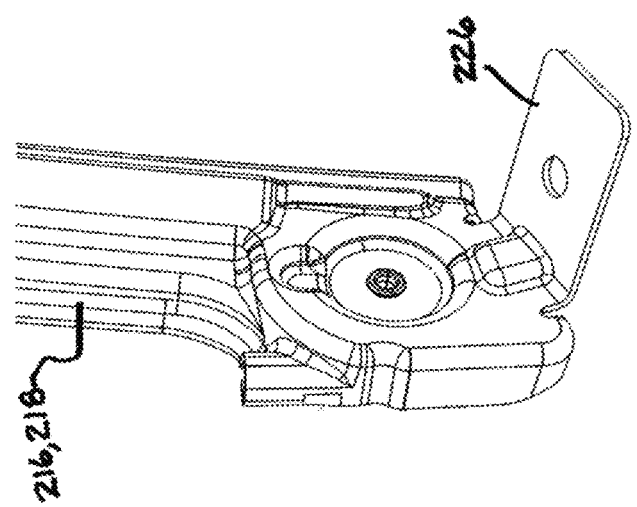
FIG. 16A is a partial perspective view of a window regulator rail in accordance with another aspect of the disclosure, with the window regulator rail including a flange of a window regulator rail adjustment mechanism.
Figure 17B:
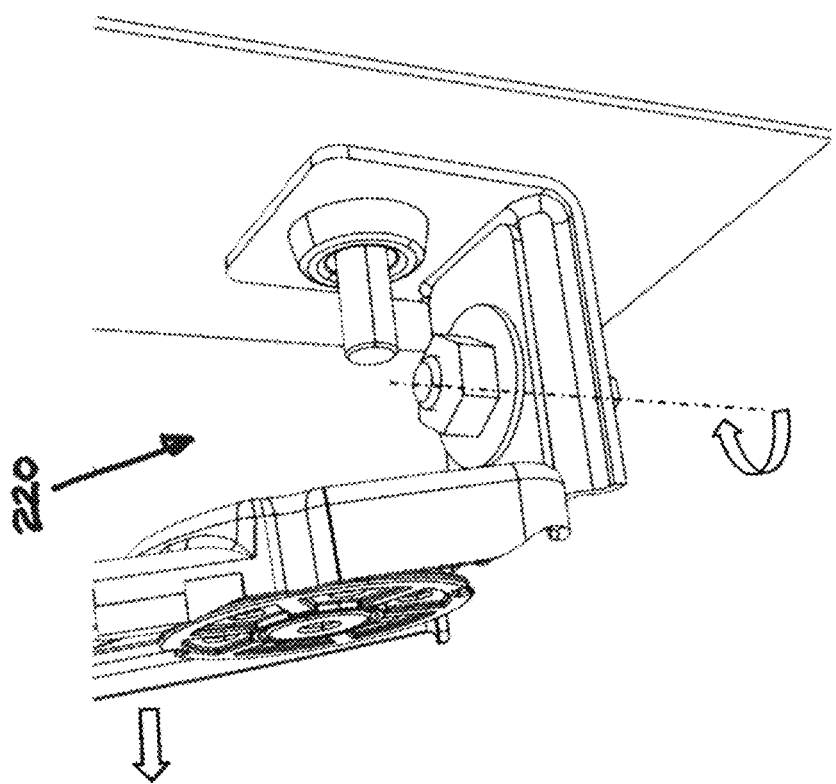
FIG. 17B illustrates the window regulator rail adjusted outwardly relative to the carrier.
Figure 17A:
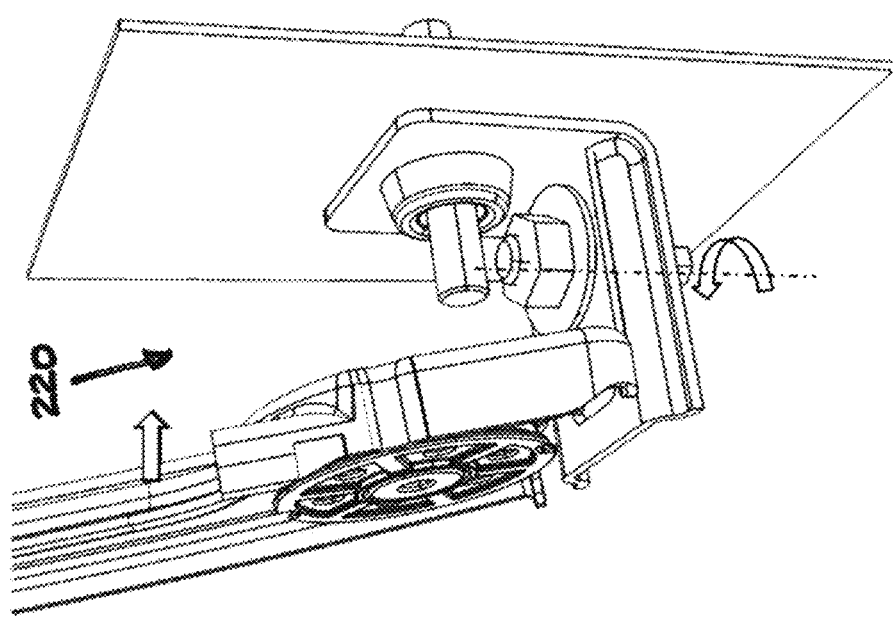
FIG. 17A illustrates the window regulator rail adjusted inwardly relative to the carrier.
Figure 18:
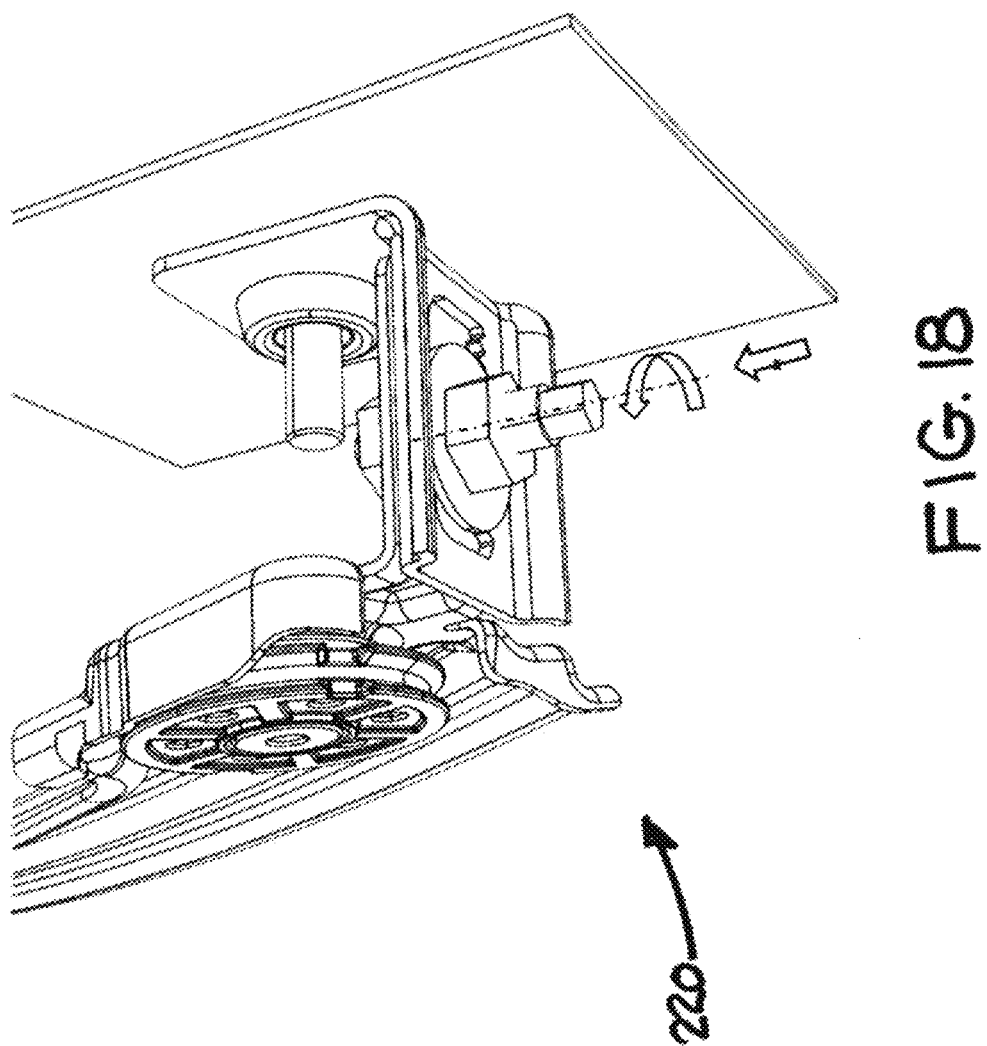
FIG. 18 is similar to FIG. 15, further illustrating a direction of tool insertion for adjustment the window regulator rail adjustment mechanism.
Figure 20:
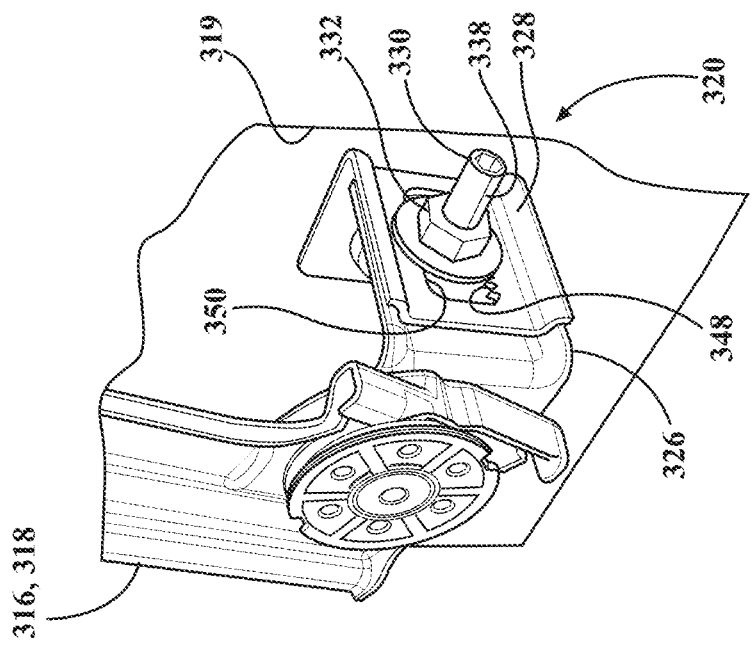
FIG. 20 is an assembled view of the window regulator rail adjustment mechanism of FIG. 19 operably connecting a window regulator rail to a carrier.

As best illustrated in FIGS. 15 and 15A, an adjustment mechanism 220 constructed in accordance with another aspect of the disclosure includes a gear support member or plate, and referred to hereafter as flange 226, a rack member 228, a gear member, also referred to a pinion shaft 230, and fastener members, shown as a pair of nuts 232. Further illustrated is a fastener 234 for fixation of the adjustment mechanism 220 to a carrier 219, wherein the fastener 234 can be provided as any desired, screw, bolt, rivet, by way of example and without limitation. Thus far, the adjustment mechanism 220 is the same as discussed above for adjustment mechanism 120; however, adjustment mechanism 220 has flange 226 constructed as a monolithic piece of material with the window regulator rail 216, 218. Otherwise, all else remains the same as discussed above for the adjustment mechanism 120, and thus, no further discussion is believed necessary for adjustment mechanism 220.

Figure 19:
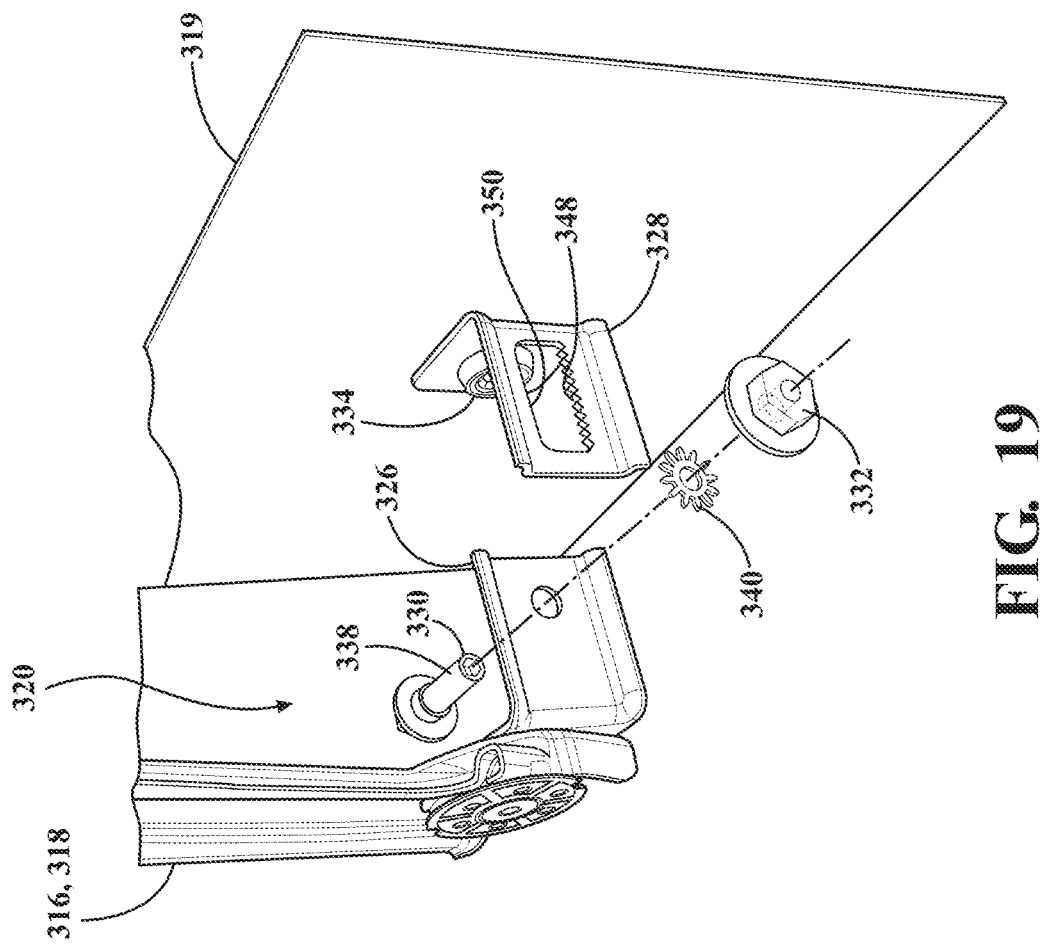
FIG. 19 illustrates an exploded view of a window regulator rail adjustment mechanism constructed in accordance with another aspect of the disclosure.

As best illustrated in FIG. 19, an adjustment mechanism 320 constructed in accordance with another aspect of the disclosure includes a gear support member or plate, and referred to hereafter as flange 326, a rack member 328, a gear member, also referred to as a pinion shaft 330, and fastener member, shown as a nut 332. Further illustrated is a fastener 334 for fixation of the adjustment mechanism 320 to the carrier 319, wherein the fastener 334 can be provided as any desired, screw, bolt, rivet, by way of example and without limitation.

The pinion shaft 330 has a threaded shank 338 extending along the X-direction with external male threads for threaded fixation to the fastener, shown as female threaded nut 332. A gear 340 is fixed to and extends radially outwardly from the threaded shank 338 for meshed engagement with the rack member 328.

The rack member 328 is generally the same as rack member 128, however, the orientation of rack member 328 is rotated 90 degrees from that of rack member 328 upon being fixed to the carrier 319. As such, upon fixing the rack member 328 to the carrier 319 via a fastener 334, as discussed above, a plurality of rack teeth 348 are configured for meshed engagement with the gear 340. Rack teeth 348 are shown, by way of example and without limitation, as being formed to extend along the Y-direction alone one side of an elongate slot 350, such that rotation of gear 340 in a first direction (clockwise in FIG. 21A) causes the teeth of the gear 340 to roll along the rack teeth 348, thereby causing the flange 326, with window regulator rail 316, 318 fixed thereto, to move in the Y-direction along a first direction, and such that rotation of gear 340 in a second direction (counterclockwise in FIG. 21B) causes flange 326, with window regulator rail 316, 318 fixed thereto, to move in the Y-direction along a second direction, with the first and second directions being opposite one another. Accordingly, rotation of pinion shaft 330 in the desired clockwise or counterclockwise direction effects adjusted movement of the window regulator rail 316, 318 in the respective first or second direction. The pinion shaft 330 can be rotated simply by a suitable tool, as discussed above for pinion shaft 130; however, rather than inserting the tool through a bottom panel 124 as discussed and illustrated for pinion shaft 130, the tool is inserted along the X-direction through an opening in shut face 122 into engagement with an end portion 352 of pinion shaft 330, wherein end portion can be located adjacent shut face 124. Accordingly, the window regulator rail 316, 318 can be readily adjusted to move along the Y-direction in a cross-vehicle direction via insertion of the tool through the shut face 122, thereby simplifying adjustment during assembly and during service.

Figure 22:
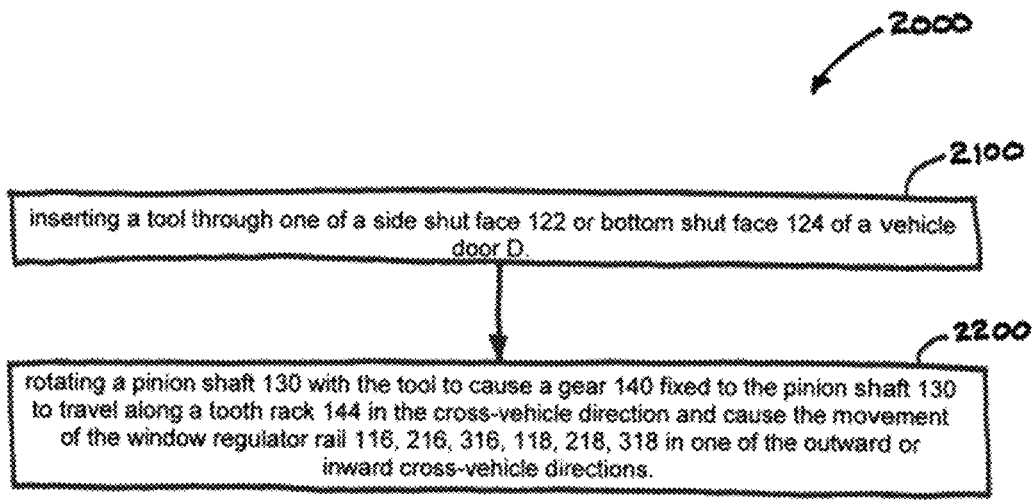
FIG. 22 illustrates a method of adjusting a window regulator rail in a cross-vehicle direction (along Y-axis) outwardly from a carrier and inwardly toward the carrier.

In accordance with a further aspect, as shown in FIG. 22, a method 2000 of adjusting a window regulator rail 116, 216, 316, 118, 218, 318 to move in a cross-vehicle direction (along Y-axis) outwardly from a carrier 119 and inwardly toward the carrier 119 is provided. The method 2000 includes a step 2100 of inserting a tool through one of a side shut face 122 or bottom shut face 124 of a vehicle door D and a step 2200 of rotating a pinion shaft 130 with the tool to cause a gear 140 fixed to the pinion shaft 130 to travel along a tooth rack 144 in the cross-vehicle direction and cause the movement of the window regulator rail 116, 216, 316, 118, 218, 318 in one of the outward or inward cross-vehicle directions.

Figure 23:
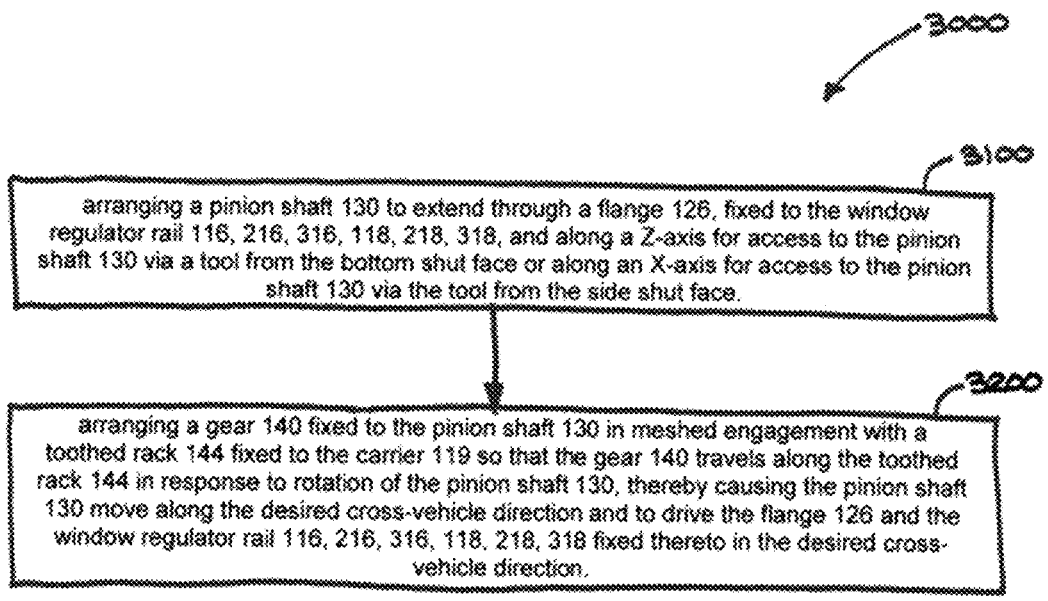
FIG. 23 illustrates a method of providing for a window regulator rail to be adjusted in a cross-vehicle direction (along Y-axis) outwardly from a carrier and inwardly toward the carrier from one of a bottom shut face or side shut face of a vehicle door.

In accordance with a further aspect, as shown in FIG. 23, a method 3000 of providing fora window regulator rail 116, 216, 316, 118, 218, 318 to be adjusted in a cross-vehicle direction (along Y-axis) outwardly from a carrier 119 and inwardly toward the carrier 119 from one of a bottom shut face or side shut face of a vehicle door D is provided. The method 3000 includes a step 3100 of arranging a pinion shaft 130 to extend through a flange 126, fixed to the window regulator rail 116, 216, 316, 118, 218, 318, and along a Z-axis for access to the pinion shaft 130 via a tool from the bottom shut face or along an X-axis for access to the pinion shaft 130 via the tool from the side shut face. The method 3000 further includes a step 3200 of arranging a gear 140 fixed to the pinion shaft 130 in meshed engagement with a toothed rack 144 fixed to the carrier 119 so that the gear 140 travels along the toothed rack 144 in response to rotation of the pinion shaft 130, thereby causing the pinion shaft 130 move along the desired cross-vehicle direction and to drive the flange 126 and the window regulator rail 116, 216, 316, 118, 218, 318 fixed thereto in the desired cross-vehicle direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lifter plate assembly for holding a window of a motor vehicle door assembly and facilitating adjustable movement of the window along a vertical direction, comprising:
    a main body having at least one rail guide hook configured for sliding receipt of a window regulator rail therein;
    a window holder fixed to said main body, said window holder providing a receptacle configured for receipt of an edge of the window therein;
    a cable holder configured for fixed attachment to at least one cable; and
    an adjustment mechanism configured to provide adjustable movement of said main body and said window holder relative to said cable holder along the vertical direction, said adjustment mechanism being adjustable via a plurality of tool-receiving features, each of said plurality of tool-receiving features being accessible along a separate first, second and third axes.

2. The lifter plate assembly of claim 1, wherein at least two of said separate first, second and third axes are inclined to one another.

3. The lifter plate assembly of claim 2, wherein at least two of said separate first, second and third axes are generally parallel to one another.

4. The lifter plate assembly of claim 3, wherein at least two of said separate first, second and third axes are generally transverse to one another.

5. The lifter plate assembly of claim 2, wherein two of said separate first, second and third axes are inclined to one another, and wherein two of said separate first, second and third axes are parallel to one another.

6. The lifter plate assembly of claim 5, wherein two of said separate first, second and third axes are transverse to one another.

7. The lifter plate assembly of claim 6, wherein said adjustment mechanism includes a rod extending along said first axis and a nut in threaded engagement with said rod, and wherein one of said tool-receiving features is provided at an end of said rod.

8. The lifter plate assembly of claim 7, further including a first gear fixed to said rod and extending about said first axis and a second gear in meshed engagement with said first gear and extending about said second axis, wherein one of said tool receiving features is provided to rotate said second gear about said second axis, thereby causing said first gear and said rod to rotate about said first axis.

9. The lifter plate assembly of claim 8, wherein said first gear and said second gear are beveled gears.

10. The lifter plate assembly of claim 8, wherein said one of said tool-receiving features is accessible through an inner panel of the motor vehicle door assembly.

11. The lifter plate assembly of claim 8, further including a third gear fixed to said rod and extending about said first axis and a fourth gear in meshed engagement with said third gear and extending about said third axis, wherein one of said tool-receiving features is provided to rotate said fourth gear about said third axis, thereby causing said third gear and said rod to rotate about said first axis.

12. The lifter plate assembly of claim 11, wherein said third gear and said fourth gear are spur gears.

13. The lifter plate assembly of claim 11, wherein one of said tool-receiving features is accessible from a belt line of the motor vehicle door assembly.

14. The lifter plate assembly of claim 7, wherein said one of said tool-receiving features is accessible through a bottom shut face of the motor vehicle door assembly.

15. A motor vehicle door assembly, comprising:
a door panel structure including an inner panel, an outer panel, and a bottom shut face, with a cavity bounded by said inner panel, said outer panel, and said bottom shut face;
a first window regulator rail and a second window regulator rail disposed in said cavity;
a window; and
a lifter plate assembly, comprising:
a main body having at least one rail guide hook configured for sliding receipt of one of the first and second window regulator rails therein to facilitate movement of the window along a vertical direction between open and closed positions;
a window holder fixed to said main body, said window holder having a receptacle configured for receipt of a bottom edge of the window therein;
a cable holder configured for fixed attachment to at least one cable; and
an adjustment mechanism configured to provide adjustable movement of said main body and said window holder relative to said cable holder along the vertical direction, said adjustment mechanism being adjustable via a plurality of tool-receiving features, each of said plurality of tool-receiving features being accessible along a separate first, second and third axes.

16. A method of constructing a lifter plate assembly for holding a window of a motor vehicle door assembly and facilitating adjustable movement of the window along a vertical direction to bring a top edge of the window into sealed engagement with a roof of the motor vehicle, comprising:
providing a main body having at least one rail guide hook configured for sliding receipt of a window regulator rail therein;
fixing a window holder having a receptacle configured for receipt of an edge of the window to said main body;
coupling a cable holder configured for fixed attachment of least one cable to said main body with an adjustment mechanism to provide adjustable movement of said main body and said window holder relative to said cable holder along the vertical direction; and
configuring the adjustment mechanism for adjustment via a plurality of tool-receiving features, and arranging each of said plurality of tool-receiving features being accessible along a separate first, second and third axes.

17. The method of claim 16, further including providing said adjustment mechanism having a rod extending along said first axis and a nut in threaded engagement with said rod, and arranging one of said tool-receiving features to be accessible through a bottom shut face of the motor vehicle door assembly.

18. The method of claim 17, further including fixing a first gear to said rod and configuring a second gear in meshed engagement with said first gear, and arranging one of said tool-receiving features to be accessible through an inner panel of the motor vehicle door assembly to rotate said second gear about said second axis to rotate said first gear and said rod about said first axis.

19. The method of claim 18, further including providing said first gear and said second gear being beveled gears.

20. The method of claim 18, further including fixing a third gear to said rod and configuring a fourth gear in meshed engagement with said third gear, and arranging one of said tool-receiving features being accessible from a belt line of the motor vehicle door assembly to rotate said fourth gear about said third axis to rotate said third gear and said rod about said first axis.

\* \* \* \* \*